(12) United States Patent
Miki

(10) Patent No.: US 7,925,832 B2
(45) Date of Patent: Apr. 12, 2011

(54) VOLUME PROVIDING SYSTEM CALLING TWO PROCESSES EXECUTING THE SAME PROGRAM CODE AND EXCHANGING INFORMATION BETWEEN THE TWO PROCESSES

(75) Inventor: Kenichi Miki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 28 days.

(21) Appl. No.: 12/469,003

(22) Filed: May 20, 2009

(65) Prior Publication Data

US 2009/0235024 A1    Sep. 17, 2009

Related U.S. Application Data

(63) Continuation of application No. 11/810,416, filed on Jun. 4, 2007, now abandoned, which is a continuation of application No. 11/436,265, filed on May 17, 2006, now Pat. No. 7,237,063, which is a continuation of application No. 10/920,974, filed on Aug. 18, 2004, now Pat. No. 7,124,242.

(30) Foreign Application Priority Data

Jun. 25, 2004   (JP) .................. 2004-188709

(51) Int. Cl.
*G06F 12/00*   (2006.01)
(52) U.S. Cl. ......... 711/114; 711/162; 711/165; 711/170
(58) Field of Classification Search ...................... None
See application file for complete search history.

(56) References Cited

U.S. PATENT DOCUMENTS

| | | | |
|---|---|---|---|
| 5,742,792 A | 4/1998 | Yanai et al. | |
| 5,835,954 A | 11/1998 | Duyanovich et al. | |
| 6,067,602 A | 5/2000 | Tremblay et al. | |
| 6,145,066 A * | 11/2000 | Atkin ........................ | 711/165 |
| 6,145,067 A | 11/2000 | Kuwata | |
| 6,363,385 B1 | 3/2002 | Kedem et al. | |
| 6,757,797 B1 | 6/2004 | Kaiya et al. | |
| 6,799,255 B1 | 9/2004 | Blumenau et al. | |
| 6,976,139 B2 | 12/2005 | Halstead et al. | |

FOREIGN PATENT DOCUMENTS

| | | |
|---|---|---|
| JP | 06-019635 A | 1/1994 |
| JP | 09-006544 A | 1/1997 |
| JP | 11-327803 A | 11/1999 |
| JP | 2002-236560 A | 8/2002 |

OTHER PUBLICATIONS

Japan Patent Office (JPO) office action for JPO patent application JP2004-188709 (Jan. 5, 2010).

* cited by examiner

*Primary Examiner* — Shawn X Gu
(74) *Attorney, Agent, or Firm* — Hitachi America, Ltd.

(57) ABSTRACT

A host computer HA1 or the like is provided with a target program 3 that receives the provision of logical volumes 212, a volume interface program 12A that provides an interface for the logical volumes 212 to the target program 3, and a volume filter program 12B that selects one logical volume from the copying source volume 212A and copying destination volume 212B, and provides the selected logical volume to the target program 3 via the volume interface program 12A.

8 Claims, 24 Drawing Sheets

FIG. 5

| VOLUME PAIR ID | FIRST VOLUME INFORMATION GROUP | | | SECOND VOLUME INFORMATION GROUP | | |
|---|---|---|---|---|---|---|
| | VOLUME INFORMATION | PAIR STATE | UTILIZABLE FLAG | VOLUME INFORMATION | PAIR STATE | UTILIZABLE FLAG |
| 1 | (VOLUME INFORMATION) | (PAIR STATE) | UTILIZABLE | (VOLUME INFORMATION) | (PAIR STATE) | UTILIZABLE |
| 2 | (VOLUME INFORMATION) | (PAIR STATE) | UTILIZABLE | (VOLUME INFORMATION) | (PAIR STATE) | UTILIZABLE |
| 3 | (VOLUME INFORMATION) | (PAIR STATE) | UTILIZABLE | (VOLUME INFORMATION) | (PAIR STATE) | UTILIZABLE |
| ... | ... | ... | ... | ... | ... | ... |

| VOLUME RECOGNIZING LOWER DRIVER DATA | I/O ISSUING LOWER DRIVER DATA |
|---|---|
| (LOWER FILTER DRIVER NAME) | (LOWER FILTER DRIVER NAME) |

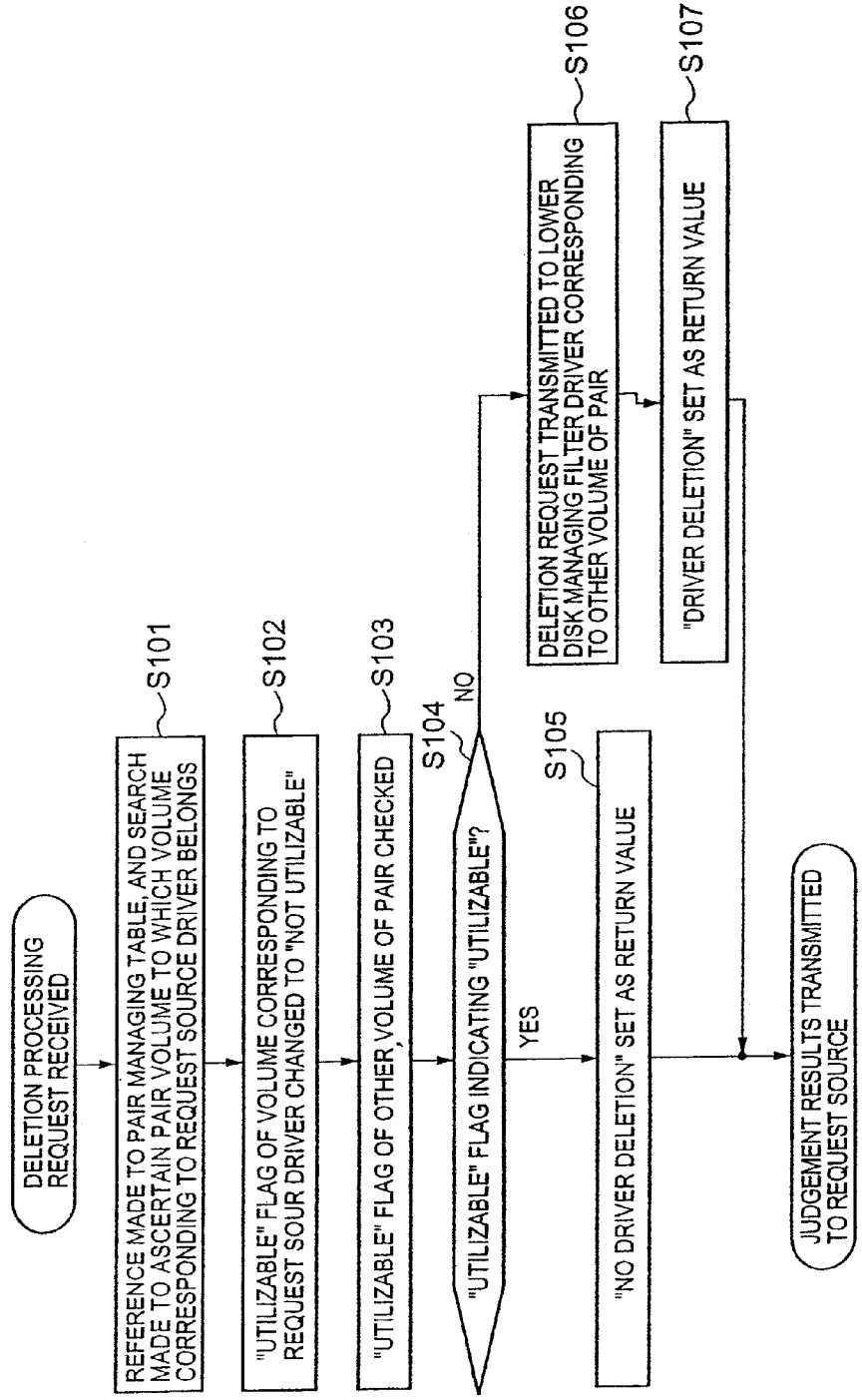

VOLUME PROVIDING SYSTEM CALLING TWO PROCESSES EXECUTING THE SAME PROGRAM CODE AND EXCHANGING INFORMATION BETWEEN THE TWO PROCESSES

CROSS-REFERENCE TO RELATED APPLICATION(S)

This is a continuation application of U.S. patent application Ser. No. 11/810,416, filed Jun. 4, 2007, which is a continuation application of U.S. patent application Ser. No. 11/436,265, filed May 17, 2006 (now U.S. Pat. No. 7,237,063), which is a continuation application of U.S. patent application Ser. No. 10/920,974, filed Aug. 18, 2004 (now U.S. Pat. No. 7,124,242), which application claims priority from Japanese Patent Application No. 2004-188709, filed Jun. 25, 2004, the entire disclosure of which is incorporated herein by reference.

BACKGROUND OF THE INVENTION

1. Field of the Invention

The present invention relates to a technique for providing a memory device for computer programs such as application software and the like.

2. Description of the Related Art

For example, storage control systems that can provide a plurality of logical volumes to higher devices as one large unit have been known in the past, as is disclosed in Japanese Patent Application Laid-Open No. 11-327803 and Japanese Patent Application Laid-Open No. 2002-236560.

For example, a data copying technique is known in which a first logical volume that is prepared on a first physical disk and a second logical volume that is prepared on a second physical disk are combined into a pair, with one of these logical volumes being used as the copying source volume and the other logical volume being used as the copying destination volume, and data in the copying source volume is copied into the copying destination volume. In this data copying technique, for example, the system is arranged so that only the copying source volume is recognized by the operating system (OS) of the higher device, and copying destination volume that is the other member of the pair is not recognized by this OS. The reason for this is that there is there is a possibility that the OS cannot operate normally if both the copying source volume and copying destination volume are simultaneously recognized by the OS. For example, if the both the copying source volume and copying destination volume are recognized as the "C drive" by the OS, there is a possibility that the OS will not be able to operate normally.

However, in data copying techniques, it is conceivable that there may be cases in which it is desirable to cause the OS (and/or the application software that is present above this OS) to recognize not only the copying source volume, but also the copying destination volume.

SUMMARY OF THE INVENTION

Accordingly, it is an object of the present invention to cause both the copying source volume and copying destination volume prepared on separate physical memory devices to be recognized by a higher device, and to prevent the occurrence of abnormalities in the higher device that might be caused by such recognition.

Other objects of the present invention will be clear from the description of embodiments below.

For example, a volume providing system according to a first aspect of the present invention can be constructed in the following environment.

A plurality of logical volumes are prepared on two or more physical disks, including a copying source volume that acts as a data copying source, and a copying destination volume that acts as a data copying destination. The two or more physical disks include one or more first physical disks, and one or more second physical disks that are separate from the one or more first physical disks. The copying source volume is disposed on the one or more first physical disks. The copying destination volume is disposed on the one or more second physical disks.

In such an environment, the volume providing system according to a first aspect of the present invention comprises a memory region that stores one or more computer programs, and one or more processors that read in at least one of the one or more computer programs from the memory region, and execute processing according to the read-in computer programs. The one or more computer programs include target programs that receive the provision of logical volumes, volume interface programs that provide the target programs with an interface for the logical volumes, and volume filter programs that select logical volumes from either the copying source volumes or the copying destination volumes, and provide the selected logical volumes to the target programs via the volume interface programs.

One logical volume may be disposed on one or a plurality of physical disks, or a plurality of logical volumes may be disposed on a single physical disk. Furthermore, some or all of the plurality of logical volumes may be disposed outside the volume providing system, or may be disposed in the volume providing system itself.

In a first embodiment according to a first aspect of the present invention, for example, at least one of the one or more processors executes the following processing. Specifically, at least one of the one or more processors prepares a copying source stack corresponding to the copying source volume, and prepares a copying destination stack corresponding to the copying destination volume. A first volume interface program and first volume filter program corresponding to the copying source volume are called up in the copying source stack, and a second volume interface program and second volume filter program corresponding to the copying destination volume are called up in the copying destination stack; moreover, a logical volume is provided to the target program via the target program via the first volume filter program. Furthermore, the second volume filter program is hidden with respect to the target program, and in cases where the copying source volume is provided to the target program, the copying source volume is provided to the target program from the first volume filter program via the first volume interface program, while in cases where the copying destination volume is provided to the target program, the copying destination volume is provided to the target program from the second volume filter program via the first volume filter program, and from the first volume filter program via the first volume interface program.

In a second embodiment according to a first aspect of the present invention, the embodiment is characterized in that in the first embodiment, for example, the first volume filter program and the second volume filter program receive I/O requests to read out data from the logical volumes or to write data into the logical volumes. The first volume filter program and the second volume filter program each acquire first volume management data indicating the volume filter program from which an I/O request for the logical volumes is to be issued. In cases where the acquired first volume management data indicates the volume filter program itself, this volume filter program issues the received I/O request to the logical volume corresponding to the volume filter program itself; on the other hand, in cases where the acquired first volume management data indicates the other volume filter program, the received I/O request is transmitted to the other volume filter program.

In a third embodiment according to a first aspect of the present invention, the embodiment is characterized in that in the first embodiment, for example, when the first volume filter program and the second volume filter program issue I/O requests to logical volumes to read out data from the logical volumes or write data into the logical volumes, the volume filter programs receive some type of response data. The first volume filter program and the second volume filter program each acquire second volume management data indicating the volume filter program from which the response data is to be transmitted to a higher device. In cases where the acquired second volume management data indicates the volume filter program itself, the volume filter program transmits the received response data to its own higher device, while in cases where the acquired second volume management data indicates the other volume filter program, the received response data is transmitted to the other volume filter program.

In a fourth embodiment according to a first aspect of the present invention, the embodiment is characterized in that in the first embodiment, for example, the one or more computer programs further include an I/O producing program that produces I/O requests to read out data from the logical volumes or to write data into the logical volumes in accordance with a specified protocol. A lower filter sub-program which distributes I/O requests produced by the I/O producing program to logical volumes that are present at a lower level than the volume filter program itself or to other lower filter sub-programs, and an upper filter sub-program which controls whether logical volumes are provided to the volume interface or hidden, is contained in each of the volume filter programs. At least one of the one or more processors successively reads out and accumulates the lower filter sub-program, the I/O producing program, the upper filter sub-program and the volume interface from lower to higher in each of the copying source stacks and the copying destination stacks.

In a fifth embodiment according to a first aspect of the present invention, at least one processor that has read in the volume filter programs switches the logical volume that is provided to the target program from the copying source volume to the copying destination volume in cases where an abnormality associated with the copying source volume is detected.

In a sixth embodiment according to a first aspect of the present invention, the one or more computer programs include a display program which displays a graphical user interface that is used to receive from the user the volume switching selection for the switching of the logical volume that is provided to the target program to another logical volume. When the volume switching selection is input by the user via the graphical user interface, the logical volume that is provided to the target program is switched from the copying source volume to the copying destination volume by at least one processor that has read in the volume filter programs.

For example, a volume providing method according to a second aspect of the present invention is performed in the following environment.

A plurality of logical volumes are prepared on two or more physical disks, including a copying source volume that acts as a data copying source, and a copying destination volume that acts as a data copying destination. The two or more physical disks include one or more first physical disks, and one or more second physical disks that are separate from the first physical disks. The copying source volume is disposed on the one or more first physical disks. The copying destination volume is disposed on the one or more second physical disks.

In such an environment, the volume providing method has a step in which one logical volume is selected from the copying source volume and the copying destination volume, and a step in which the selected logical volume is provided to the target program via the volume interface program.

The computer program that is recorded on a recording medium according to a third aspect of the present invention is executed (for example) in the following environment.

A plurality of logical volumes are prepared on two or more physical disks, including a copying source volume that acts as a data copying source, and a copying destination volume that acts as a data copying destination. The two or more physical disks include one or more first physical disks, and one or more second physical disks that are separate from the one or more first physical disks. The copying source volume is disposed on the one or more first physical disks. The copying destination volume is disposed on the one or more second physical disks. Furthermore, the computer has a target program that receives the provision of a logical volume, and a volume interface program that provides an interface for the logical volume to the target program.

In this case, a computer program which is used to cause the computer to execute a step in which one logical volume is selected from the copying source volume and the copying destination volume, and a step in which the selected logical volume is provided to the target program via the volume interface program, is recorded on the recording medium.

A volume providing system according to a fourth aspect of the present invention can be constructed in the following environment.

A plurality of logical volumes are prepared on two or more physical disks, including a copying source volume that acts as a data copying source, and a copying destination volume that acts as a data copying destination. The two or more physical disks include one or more first physical disks, and one or more second physical disks that are separate from the first physical disks. The copying source volume is disposed on the one or more first physical disks. The copying destination volume is disposed on the one or more second physical disks.

The abovementioned volume providing system comprises volume receiving means for receiving the provision of logical volumes, volume interface means for providing an interface for logical volumes to the volume receiving means, and volume filtering means for selecting one logical volume from the copying source volume and the copying destination volume, and providing the selected logical volume to the volume receiving means via the volume interface means.

For example, some or all of the abovementioned means or steps can be realized using hardware, computer programs or a combination of both. For example, the computer programs can be fixed and distributed in memory media such as hard disks, optical disks, semiconductor memories or the like. Alternatively, such programs can also be distributed via a communications network such as the internet or the like.

Furthermore, the abovementioned volume providing system can be constructed within a single computer machine (e.g., a personal computer or server), or can be constructed using a plurality of computer machines that are connected to a communications network.

BRIEF DESCRIPTION OF THE DRAWINGS

FIG. 5 shows an example of the construction of the pair managing table;

FIG. 13 shows an example of the construction of the lower disk control information;

FIG. 20 shows one example of the flow of the processing that is performed by the managing module 3400 that has received a request for deletion processing;

DESCRIPTION OF THE PREFERRED EMBODIMENTS

Embodiments of the present invention will be described below with reference to the attached figures.

Figure 1A:
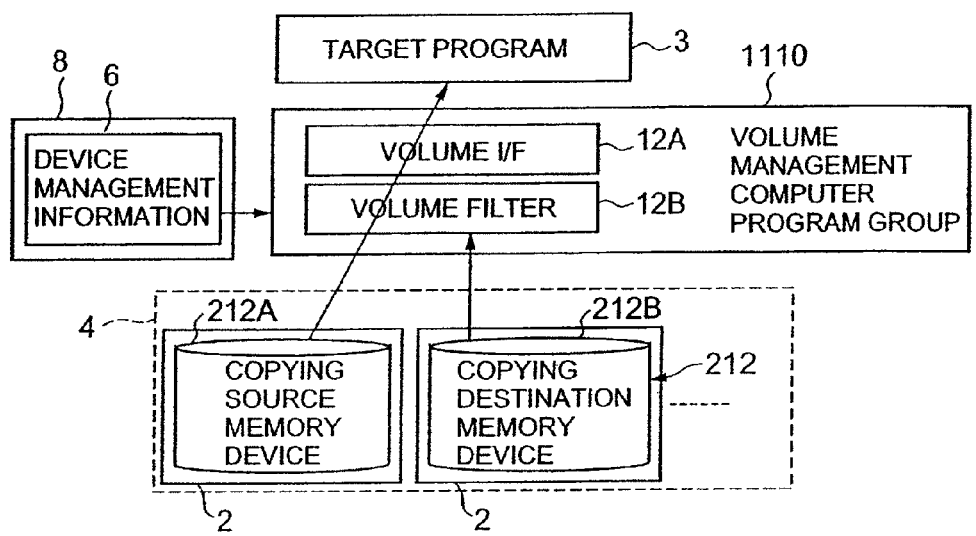
FIG. 1A shows a schematic concept of one embodiment of the present invention.
Figure 1B:
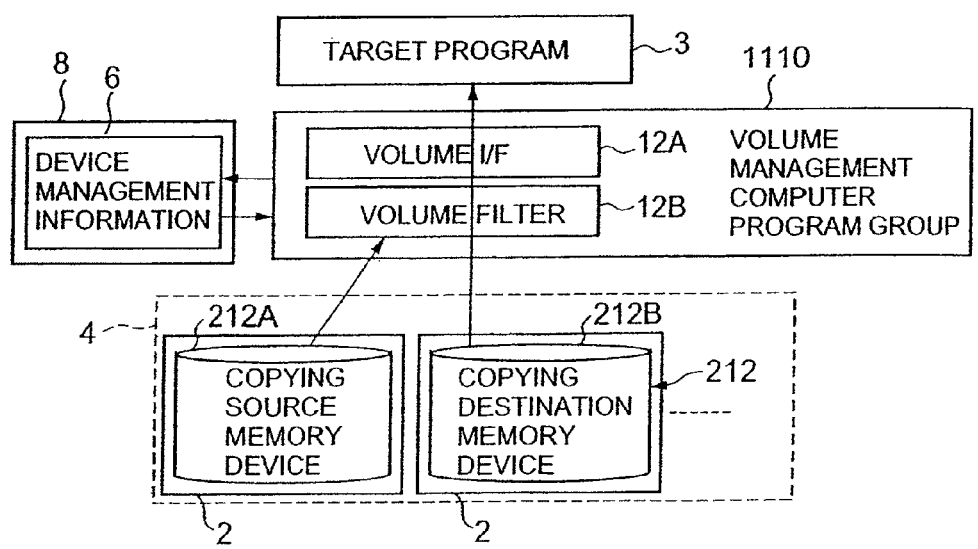
FIG. 1B shows an another schematic concept of one embodiment of the present invention.

FIGS. 1A and 1B show the schematic concept of one embodiment of the present invention. In concrete terms, FIG. 1A is a schematic diagram showing a case in which a copying source volume 212A is provided, and FIG. 1B is a schematic diagram showing a case in which a copying destination volume 212B is provided.

One or a plurality of volume groups 4 are provided, each of which his constructed from a plurality of logical memory devices (hereafter referred to as "logical volumes") 212. Each of the plurality of logical volumes that constitute the volume group(s) 4 is prepared in a plurality of physical memory devices 2. Among the plurality of logical volumes 212 that constitute the volume group 4, one logical volume is a copying source volume 212A, and one or more other logical volumes are copying destination volumes 212B.

Volume management information 6 is present in a specified memory region (e.g., a region in a memory device such as a memory, hard disk or the like) 5. The volume management information 6 contains information elements relating to each of the plurality of logical volumes 212. For example, at least one type of information selected from a set comprising the volume group 4 to which the logical volume belongs, the volume ID, information indicating the path to the volume (e.g., access path name), information indicating whether or not the volume can be utilized, ID of the other volume in the pair, and pair state (e.g., copying source or copying destination) is used for each logical volume 212 as the information element(s) contained in the volume management information 6.

A target program (e.g., OS or host application program) 3 that recognizes the volumes is present.

Furthermore, a volume management computer program group 1110 is provided. The volume management computer program group 1110 comprises one or a plurality of computer programs. For example, the volume management computer program group 1110 comprises a volume I/F program (hereafter abbreviated to "volume I/F") 12A that provides an interface for volumes 212 to the target program 3, and a volume filter program (hereafter abbreviated to "volume filter") 12B that provides volumes to the target program 3 via the volume I/F 12A, or is hidden. The volume management computer program group 1110 controls which of the plurality of logical volumes 212 in the same volume group 4 is provided to the target program 3.

For example, as is shown in FIG. 1A, the volume management computer program group 1110 provides the copying source volume 212A to the target program 3 on the basis of the volume management information 6. In this case, the volume management computer program group 1110 can recognize the copying destination volume 212B, but hides this copying destination volume 212B instead of providing this volume to the target program 3. In other words, the target program 3 recognizes the copying source volume 212A via the volume I/F 12A, but does not recognize the copying destination volume 212B.

Furthermore, for example, as is shown in FIG. 1B, in cases where an abnormality occurs in the copying source volume 212A itself, or in the path between this volume and the volume management computer program group 1110 or the like, the volume management computer program group 1110 switches the volume that is provided to the target program 3 from the copying source volume 212A to the copying destination volume 212B. In this case, the volume filter 12B provides the copying destination volume 212B to the target program 3, and ceases to provide the copying source volume 212A (i.e., hides the copying source volume 212A from the target program 3). In other words, the target program 3 recognizes the copying destination volume 212B via the same volume I/F 12A, but no longer recognizes the copying source volume 212A that was recognized up to this point.

Furthermore, in the case of FIG. 1B, the pair state (one information element included in the volume management information 6) of the provided copying destination volume 212B may be altered from copying destination to copying source, and the pair state of the hidden copying source volume 212A may be altered from copying source to copying destination. Furthermore, the volume management computer program group 1110 may provide the copying destination volume 212B to the target program 3 after copying the data contained in the hidden copying source volume 212A into the provided copying destination volume 212B.

The various constituent elements describe above may be disposed on a communications network. For example, the target program 3 and volume management computer program group 1110 may be disposed in a single higher device, or may be dispersed among a plurality of higher devices. Furthermore, the volume management information 6 may be disposed in a higher device, or may be disposed in a different node. Moreover, the plurality of logical volumes 212 that constitute one volume group 4 may be disposed in the same storage control system (e.g., RAID system), or may be dispersed among two or more storage control systems.

Several examples of the present embodiment will be described below.

Example 1

Figure 2:
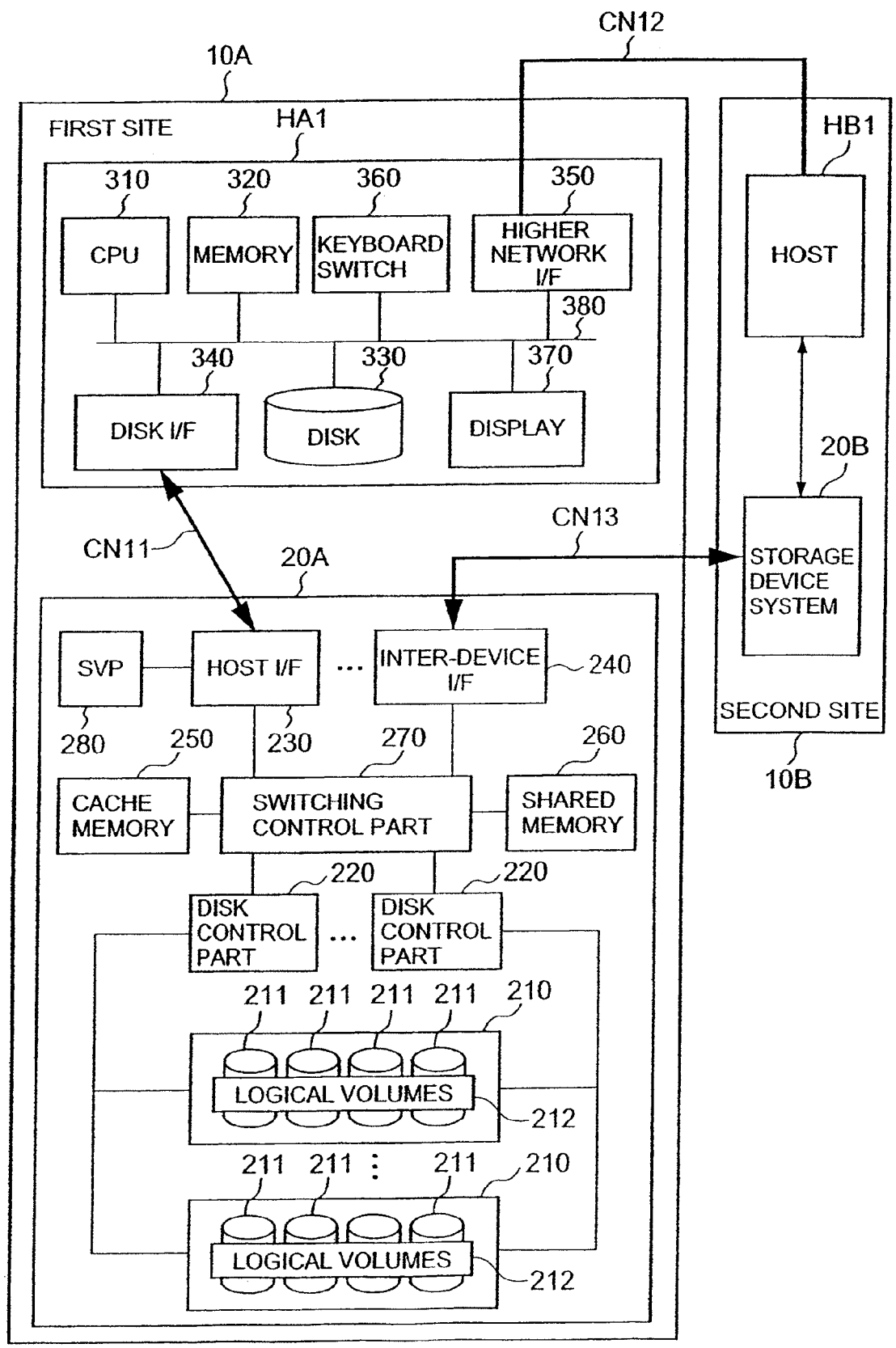
FIG. 2 shows an overall structural diagram of a storage system constituting a first embodiment of the present invention.

FIG. 2 is a block diagram which shows an overall outline of the storage system. For example, this storage system comprises a first site 10A and a second site 10B. The respective sites 10A and 10B are connected by communications networks CN12 and CN13. Furthermore, the storage system can also be constructed from three or more sites.

For example, the first site 11A and second site 10B may be located in different cities. Furthermore, for example, the first site 10A and second site 10B may be located at different geographical points within the same administrative region. Furthermore, for example, the first site 10A and second site 10B may be disposed in different buildings within the same development area.

The first site 10A and second site 10B have basically the same structure. As long as a disaster recovery function can be manifested, the two sites 10A and 10B may have different constructions. As one example, the first site 10A is a currently used site (operating site) that provides an information processing service to client machines not shown in the figures. The second site 10B is a backup site (standby site) that provides backup in cases where trouble occurs in the first site 10A.

Of course, the sites as a whole need not be used as an operating system or standby system; operating sites and standby sites can be respectively set for each application program that provides an information processing service. For example, the operating site of a first application program can be set as the first site 10A, and the operating site of a second application program can be set as the second site 10B.

The first site 10A comprises a plurality of host computers HA1, HAn, and a storage control system 20A. For example, each host computer HA1, HAn is constructed as a server machine that uses a microcomputer.

For example, the storage control system 20A can be constructed as a disk array subsystem. As will be described later, the storage control system 20A comprises a plurality of logical volumes 212, and these logical volumes 212 are utilized by the host computers HA1, HAn.

The respective host computers HA1, HAn are connected to the storage control system 20A via an intra-site communications network CN11. For example, this intra-site communications network CN11 is constructed as a SAN (storage area network), and performs data communications according to a fiber channel protocol.

The respective host computers HA1, HAn are connected via a communications network CN12 that connects the host computers to each other. Furthermore, the respective host computers HA1, HAn of the first site 10A are also mutually connected with the respective host computers HB1, HBn of the second site 10B via the communications network CN12. For example, this communications network CN12 between host computers is constructed as a network such as a LAN (local area network), WAN (wide area network), MAN (metropolitan area network) or the like, and performs data communications on the basis of a TCP/IP (transmission control protocol/internet protocol) or the like.

Like the first site 10A, the second site 10B also comprises a plurality of host computers HB1, HBn, and a storage control system 20B. Since the constructions of these parts are similar to those described in the case of the first site 10A, a description is omitted here.

Here, the storage control system 20A and storage control system 20B are directly connected by a remote copying line CN13 as a network between memory devices. For example, the remote copying line CN13 is constructed by means of a dedicated line or public circuit.

Furthermore, the intra-site network CN11 is not limited to a construction using a fiber channel protocol (SCSI: small computer system interface); for example, a construction may be used in which data transfer at the block level is executed by an IP net with SCSI commands packaged in IP packets, as in iSCSI.

The host computer HA1 and storage control system 20A will be described below as typical examples. The following description of the host computer HA1 and storage control system 20A is also applicable to the other host computers and storage control systems.

For example, the host computer HA1 comprises a CPU 310, a memory 320, a disk 330, a disk interface (hereafter referred to as an "I/F") 340, a higher network IF 350, a keyboard switch 360 and a display 370. These respective parts are connected to each other by a bus 380.

The CPU (central processing unit) 310 reads in and executes program codes stored in the memory 320. Various types of processing or functions such as cluster control, remote copying control and the like are realized in the host computer HA1 as a result of the execution of specified program codes by the CPU 310.

For example, the memory 320 is constructed from a ROM (read only memory), RAM (random access memory) or the like. In the figures, no distinction is made between ROM and RAM; in actuality, however, a ROM that stores program codes and the like and a RAM that is used as a temporary memory region, working region or the like are provided. For example, the disk 330 is constructed as a hard disk drive. For instance, programs and data are stored on the disk 330. In some cases, furthermore, some of the memory regions of the disk 330 may be used for the temporary storage of files.

The disk I/F 340 is a circuit that controls the exchange of data with the storage control system 20A via the intra-site network CN11. For example, the disk I/F 340 controls data transfer at the block level on the basis of SCSI, iSCSI or the like. The higher network I/F 350 is a circuit that controls the exchange of data with the other host computers (HAn, HB1 through HBn) via the network CN12 between host computers. For example, the higher network I/F 350 controls data transfer on the basis of IP (internet protocol).

The keyboard switch 360 is one example of information input means; the system manager can input necessary instructions and the like via the keyboard switch 360. The display 370 is one example of information output means; for example, this display 370 is constructed from a CRT (cathode ray tube) display, liquid crystal display, plasma display, EL (electronic luminescent) display or the like. Various types of information are displayed on the display 370, either automatically or in accordance with explicit requests from the system manager. Furthermore, the present invention is not limited to such means; for example, a voice input device, voice output device, pointing device, printer or the like may also be used.

Next, the hardware construction of the storage control system 20A will be described. For example, the storage control system 20A is constructed so that this system comprises a RAID group 210, disk control part 220, host I/F 230, inter-device I/F 240, cache memory 250, shared memory 260, switching control part 270 and service processor (SVP) 280.

The RAID (redundant array of independent disks) group 210 contains a plurality of disk drives 211, and provides redundant memory based on RAID such as RAID1, RAID5 or the like. For example, the respective disk drives 211 can be constructed from hard disk drives, semiconductor memory devices, optical disk drives, optical-magnetic disk drives or the like. One or more logical volumes 212 constituting logical memory regions can be set in the physical memory regions provided by the respective disk drives 211. Large quantities of data that are utilized by the host computers H are stored in the logical volumes 212. Furthermore, control information and the like can be stored in other logical volumes 212, so that these logical volumes can also be utilized as system regions. Moreover, it is not necessary that all of the disk drives 211 be positioned inside the housing of the storage control system 20A. For example, logical volumes possessed by other storage control systems (not shown in the figures) disposed in the same site can be used as logical volumes of the storage control system 20A. In the following description, "logical volumes" may be abbreviated to "volumes" in some cases.

The disk control part 220 is a part that controls the exchange of data with the respective disk drives 211. For example, the disk control part 220 is constructed as a microcomputer system that contains a CPU and a ROM, RAM or the like. A plurality of disk control parts 220 are installed inside the storage control system 20A. For example, the disk control parts 220 perform data transfer at the block level with the disk drives 211 on the basis of SCSI, iSCSI or the like.

The host I/F 230 is a part that controls data transfer with the host computers H via the intra-site network CN11. Like the disk control part 220, the host I/F 230 can be constructed as a microcomputer system. Host I/Fs 230 can be respectively prepared in accordance with the type of the host computers H (server, main frame, or the like). Furthermore, in the present embodiment, a case in which the host computers H are constructed as servers is described as an example; however, these host computers H may also be main frame computers.

The inter-device IF 240 is a part that performs data communications with the storage control system 20B of the other site 10B via the remote copying line CN13. The inter-device I/F 240 transfers updated data and difference data written into the logical volumes 212 to the other storage control system 20B without the intermediaryship of the host computers H.

For example, the cache memory 250 can be constructed from a volatile or nonvolatile semiconductor memory. The cache memory 250 stores write data from the host computers H (data that is written into the logical volumes). Furthermore, the cache memory 250 stores data that is read out from the logical volumes 212 (hereafter referred to as "read data") For example, the shared memory 260 can be constructed from a nonvolatile or volatile semiconductor memory. The shared memory 260 stores various types of commands received from the host computers H and control information and the like that is used in the control of the storage control system 20A. Such commands, control information and the like are redundantly stored by a plurality of shared memories 260. Furthermore, the cache memory 250 and shared memory 260 can be constructed as respectively separate memories, or a part of one memory can be used as a cache memory region, while the remaining part of this memory is used as a shared memory region.

The switching control part 270 is a part that mutually connects the respective disk control parts 220, the respective host I/Fs 230, the inter-device I/F 240, the cache memory 250 and the shared memory 260. For example, the switching control part 270 can be constructed from an ultra-high-speed cross-bar switch or the like.

The SVP 280 collects and monitors the states of the respective parts inside the storage control system 20A via the host I/F 230. The SVP 280 outputs the collected internal state information to an external management terminal (not shown in the figures) as raw data or as data that has been subjected to statistical processing. Examples of information that can be collected by the SVP 280 include device construction, power supply alarm, temperature alarm, input-output speed (IOPS) and the like. The system manager can perform setting alterations of the RAID construction and opening and closing processing of various types of packages (host I/F, disk control part and the like) from the management terminal via the SVP 280.

Next, one example of the processing that is performed by the storage control system 20A will be described. The host I/F 230 receives write commands and write data from the host computers H via the intra-site network CN11. The received write commands are stored in the shared memory 260, and the received write data is stored in the cache memory 250. The disk control part 220 occasionally refers to the shared memory 260. When the disk control part 220 discovers an unprocessed write command stored in the shared memory 260, the disk control part 220 reads out the write data from the cache memory 250 in accordance with this write command, and performs an address conversion and the like. The disk control part 220 stores the write data in the respective disk drives 211 constituting the logical volume 212 designated by the write command.

A case in which a read request from a host computer H is processed will be described. When the host I/F 230 receives a read command from a host computer H, this read command is stored in the shared memory 260. When the disk control part 220 discovers an unprocessed read command in the shared memory 260, the disk control part 220 reads out the data from the respective disk drives 211 constituting the logical volume 212 designated by this read command. The disk control part 220 stores the read-out data in the cache memory 250. Furthermore, the disk control part 220 notifies the host I/F 230 (via the shared memory 260) that the reading of the requested data has been completed. The host I/F 230 reads in the data from the cache memory 250, and transmits this data to the host computer H.

The above is an example of the hardware construction in the storage system of the present embodiment. Furthermore, it goes without saying that the site, the host computer HA1 and the storage control system 20A are not limited to the constructions described above.

Next, various computer programs that operate in the host computer HA1 will be described. Furthermore, in the following description, in cases where reference is made to either write commands or read commands that are output from the host computer HA1, these commands will be referred to collectively as "I/O requests".

Figure 3:
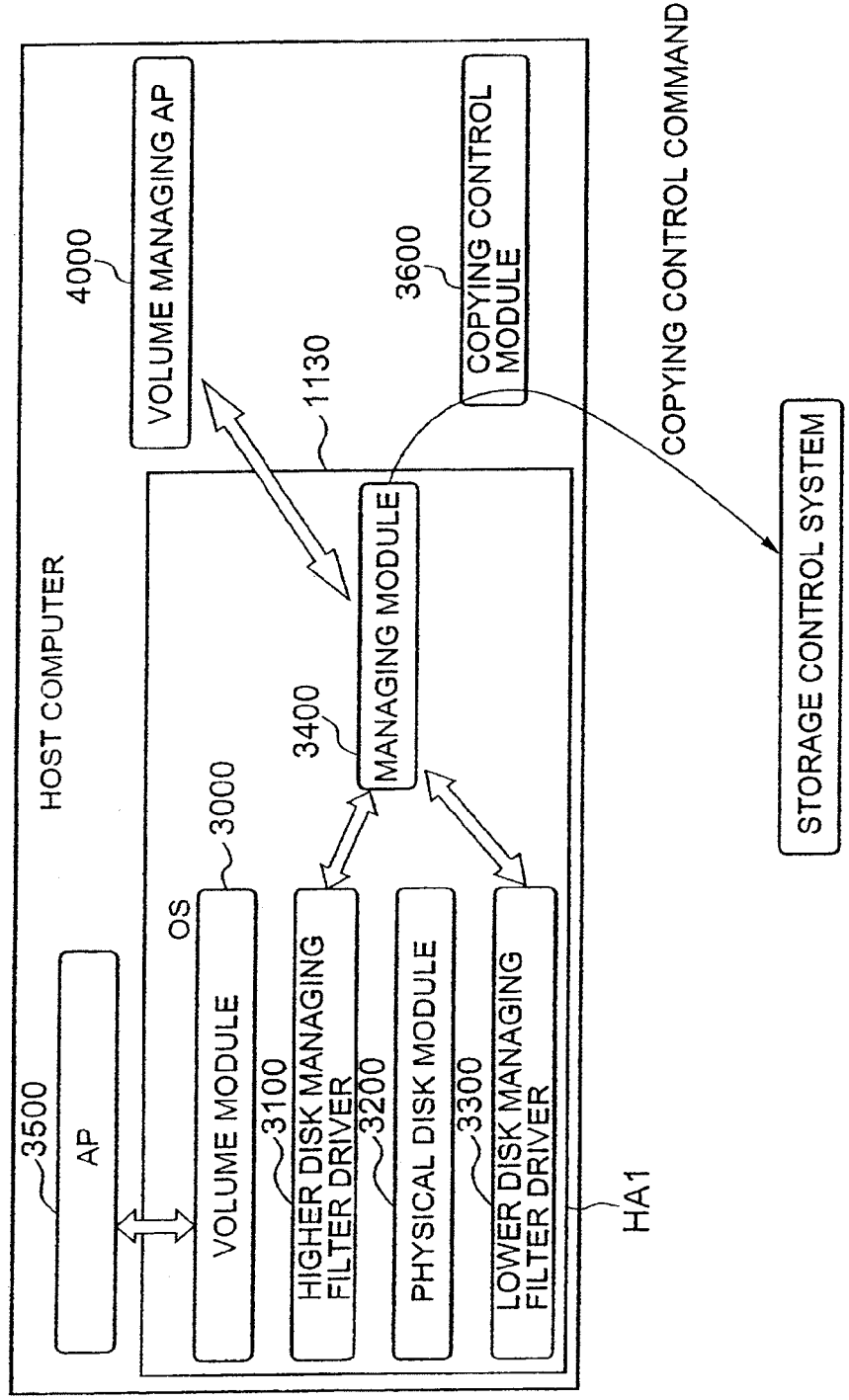
FIG. 3 shows various types of computer programs that are operated inside the host computer HA1.

FIG. 3 shows various computer programs that operate in the host computer HA1.

An operating system (hereafter referred to as "OS") 1130 such as Windows (registered trademark), Linux (registered trademark) or the like, one or a plurality of application programs (hereafter referred to as "AP") that operate on the OS 1130, and a copying control module 3600 that is used to perform copying control (described later), are installed in the host computer HA1. For example, the respective computer programs 1130, 3500 and 3600 are stored on a disk 330, and some or all of these programs are read into the CPU 310 via the memory 320, so that the processing that is specific to these computer programs is executed.

The one or plurality of APs include volume management APs 4000 that are used for volume management, and other APs (hereafter referred to as "second APs") 3500.

For example, a volume module 3000 and a physical disk module 3200 are installed as sub-computer programs in the OS 1130. In the present embodiment, furthermore, the following sub-computer programs, i.e., a lower disk managing filter driver 3300, a higher disk managing filter driver 3100, and a managing module 3400, are further installed. In the present embodiment, the system is constructed so that the lower disk managing filter driver 3300 is positioned in the lowest position in the OS 1130, the physical disk module 3200 is positioned above this, the higher disk managing filter driver 3100 is positioned above this, and the volume module 3000 is positioned above this. The managing module 3400 controls the lower disk managing filter driver 3300 and higher disk managing filter driver 3100, performs control based on the input from the volume management AP(s) 4000, and sends instructions for the execution of copying to the copying control module 3600. In response to instructions from the managing module 3400, the copying control module 3600 transmits copying control commands for performing copying processing in accordance with the instructions, e.g., for performing shadow image copying or remote copying, to the storage control system 20A. Here, the term "shadow image copying" refers to the copying of data from the copying source volume to the copying destination volume within the same storage control system 20A. In contrast, "remote copying" refers to the copying of data from the copying source volume inside the first storage control system 20A to the copying destination volume in a storage control system 20B that is different from (e.g., remote from) the storage control system 20A.

The above is one example of the computer programs that are installed in the host computer HA1. At least one of the programs, i.e., the managing computer 3400, higher disk managing filter driver 3100 and lower disk managing filter driver 3300, may be formed as in integral unit. Furthermore, at least one of the programs (i.e., the managing computer 3400, higher disk managing filter driver 3100 and lower disk managing filter driver 3300) may construct the volume management computer program group 1110 (see FIG. 1).

According to the above description, a lower disk managing filter driver 3300, a higher disk managing filter driver 3100 and a managing module 3400 are installed in the OS 1130 in addition to the volume module 3000 and physical disk module 3200; however, both the copying source volume and the copying destination volume can be provided to the host computer HA1 by these sub-computer programs, and the volume (of these two volumes) that is provided can be selected by means of software. This will be described in detail below.

In the present embodiment, for example, a table in which information relating to logical volumes in a pair state that does not form a volume pair is described, and a table in which information relating to the volume pairs is described, are prepared as information that is used by the managing module 3400. For example, these tables can be held in the managing module 3400. The managing module 3400 can register these tables in the memory 320, and use the tables.

Figure 4:
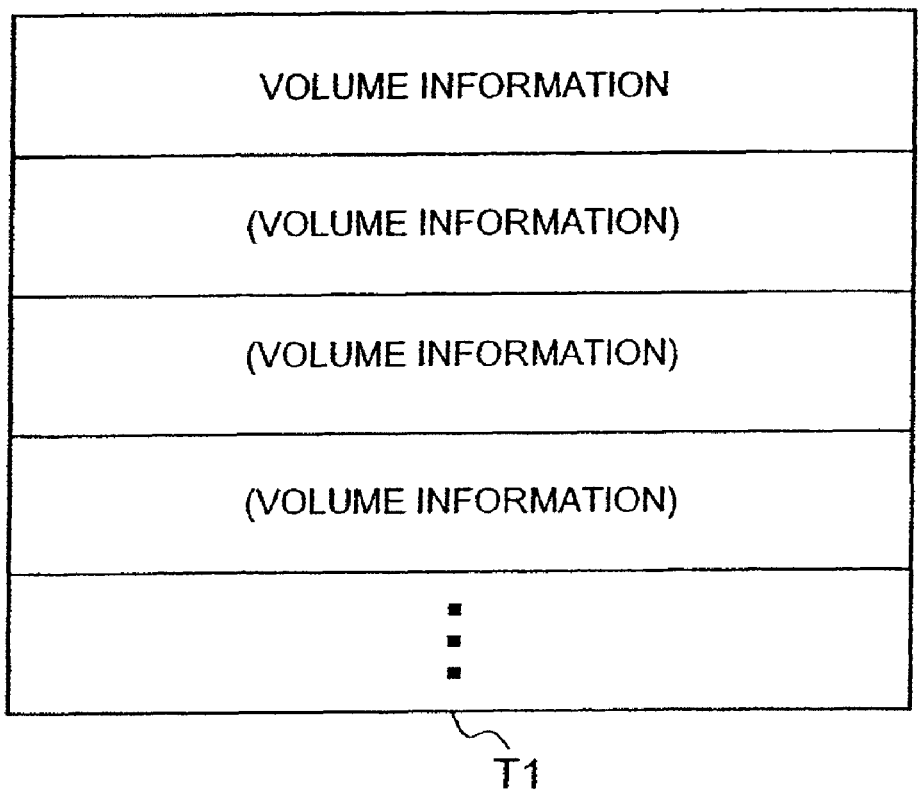
FIG. 4 shows an example of the construction of the pool managing table.

FIG. 4 shows an example of the construction of the pool managing table. Volume information relating to each of the one or more logical volumes which are in a pool state that does not form a volume pair (among the plurality of logical volumes that can be provided to the host computer HA1) is registered in the pool managing table T1. The volume information for the logical volumes includes (for example) target ID of the communications ports that are designated when the logical volumes are accessed, the logical unit numbers (LUN) to which the logical volumes belong, RAID information (e.g., the RAID group or RAID level that forms the logical volumes) and the logical volume numbers.

By referring to this pool managing table T1, the managing module 3400 (or some other computer program) can judge which of the logical volumes (among the plurality of logical volumes that can be provided to the host computer HA1) do not form volume pairs. FIG. 5 shows an example of the construction of the pair managing table.

Information relating to the logical volumes that form volume pairs (among the plurality of logical volume that can be provided to the host computer HA1), i.e., information for each volume pair, is registered in the pair managing table T2. In concrete terms, for example, in the pair managing table T2, a pair ID that is used to specify the volume pair, a first volume information group and a second volume information group are registered for each volume pair. The respective volume information groups contain volume information relating to the copying source or copying destination volume, pair states, and "utilizable" flags. The volume information includes information of the same type as the volume information that is registered in the pool managing table T1. The pair states are the states of the corresponding logical volumes, and are one of the following states: i.e., pair division state, copying source state and copying destination state (these respective states will be described in detail later). The "utilizable" flag indicates whether or not the corresponding logical volume is utilizable. In the present embodiment, as a rule, the volumes corresponding to information that is registered in the first volume information group column are volumes that are recognized by the second AP 3500, and the volumes corresponding to information that is registered in the second volume information group column are volumes that are hidden from the second AP 3500.

By referring to this pair managing table T2, the managing module 3400 (or some other computer program) can judge which two logical volumes (among the plurality of logical volumes that can be provided to the host computer HA1) form a volume pair. Furthermore, by referring to the pair managing table T2, the managing module 3400 (or some other computer program) can judge (for each volume pair) whether or not the two logical volumes that form the volume pair are respectively utilizable.

Information for some or all of the logical volumes that are present in the storage control system 20A (and/or the other storage control system 20B) is registered in the pool managing table T1 and pair managing table T2.

Figure 6:
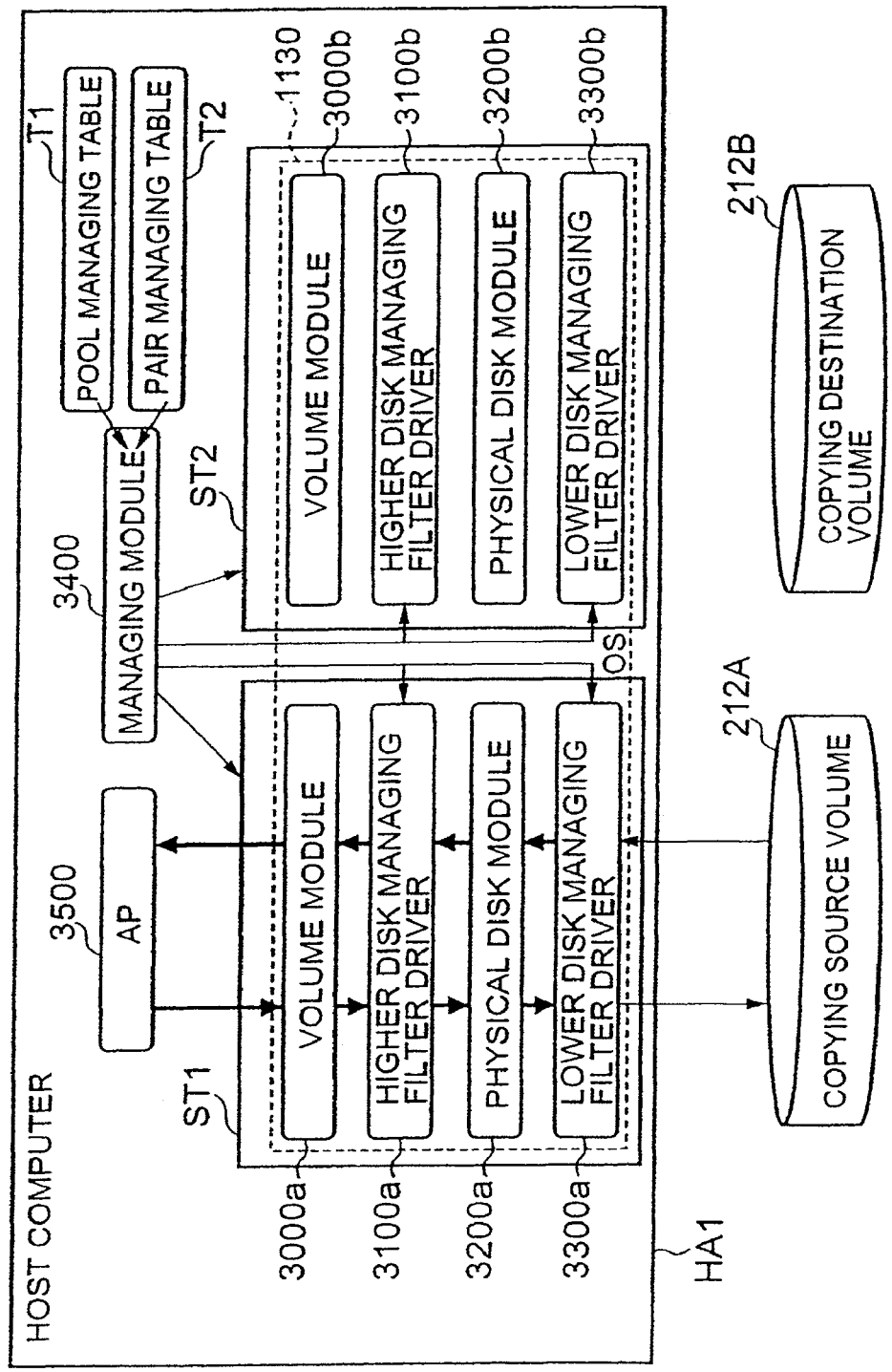
FIG. 6 shows an example of the cooperation among a plurality of sub-computer programs in a case where the first volume (of the first and second volumes forming the volume pair) is provided to a second AP 3500.

FIG. 6 shows the cooperation among the plurality of sub-computer programs in a case where the first volume (of the first and second volumes that form the volume pair) is provided to the second AP 3500.

Before this example of cooperation is described, the manner in which the plurality of sub-computer programs are constructed in the host computer HA1 will first be described.

The managing module 3400 refers to the pool managing table T1 and pair managing table T2, and prepares a plurality of program stacks respectively corresponding to the plurality of logical volumes that are present in the storage control system 20A (and/or the other storage control system 20B). In concrete terms, for example, the managing module 3400 prepares a program stack ST1 corresponding to the first volume 212A and a program stack ST2 corresponding to the second volume 212B, for a given volume pair.

Then, the managing module 3400 calls up the sub-computer programs in the respective program stacks ST1 and ST2, in the following order: lower disk managing filter driver 3300, physical disk module 3200, higher disk managing filter driver 3100 and volume module 3000. As a result, device drivers that are used exclusively or the logical volumes corresponding to the program stacks are constructed for each of the program stacks ST1 and ST2. Furthermore, in FIG. 6, "a" is assigned as a branch symbol to the sub-computer programs called up in the program stack ST1, and "b" is assigned as a branch symbol to the sub-computer programs called up in the program stack ST2. Below, the sub-computer programs on the side of the branch symbol "a" will be described as typical examples.

The volume module 3000a provides the volume that is the object of volume recognition to the second AP 3500 by means of the higher disk managing filter driver 3100a. Furthermore, the volume module 3000a receives a write request or read request from the second AP 3500, and notifies the higher disk managing filter driver 3100a that is located below of this.

The higher disk managing filter driver 3100a receives an instruction to cause recognition or hiding of the volume 212A corresponding to the higher disk managing filter driver itself for the second AP 3500 from the managing module 3400, and determines whether to cause recognition or hiding from the higher units in accordance with the received instruction. In addition, the higher disk managing filter driver 3100a transmits write requests or read requests from above to the lower physical disk module 320a, and transmits data from below to the higher units.

The physical disk module 3200a converts the write requests or read requests from above into commands with a specified format (e.g., I/O requests (described later) based on an SCSI protocol), and transmits these commands to the lower disk managing filter driver 3300a below. In addition, the physical disk module 3200a transmits data from below to the higher units.

The lower disk managing filter driver 330a controls whether I/O requests from above are transmitted to the storage control system 20A with the volume 212A corresponding to the lower disk managing filter driver itself as the destination, or are transferred to a separate lower disk managing filter driver 3300a. This control is accomplished by referring to lower disk control information (described later; see FIG. 13).

In addition, the lower disk managing filter driver 3300a controls whether the return values for issued I/O requests (e.g., status codes such as "successful" or "failure") are transmitted to higher units or are transferred to another lower disk managing filter driver 3300a. This control is also accomplished by referring to lower disk control information (described later; see FIG. 13).

In this first embodiment, for example, in cases where the volume module 3000a that causes the volume to be recognized by the second AP 3500 receives a write request or read request, the volume module 3000a transmits this write request or read request to the higher disk managing filter driver 3100a located below within the same program stack ST1. The higher disk managing filter driver 3100a transmits the write request or read request to the physical disk module 3200a that is located below within the same program stack ST1. The physical disk module 3200a converts this write request or read request into an I/O request, and transmits the I/O request to the lower disk managing filter driver 3300a within the same program stack ST1. The lower disk managing filter driver 3300a refers to lower disk control information (described later), and if this lower disk managing filter driver 3300a is itself set as the I/O issuing lower driver data, the lower disk managing filter driver 3300a issues an I/O request addressed to the volume 212A that corresponds to the lower disk managing filter driver itself.

In cases where the lower disk managing filter driver 3300a receives data from the storage control system 20A (e.g., in cases where this driver receives the return value of an I/O request (described later)), the lower disk managing filter driver 3300a refers to the lower disk control information (described later), and if this lower disk managing filter driver 3300a is itself set at the volume recognizing lower driver data, the received data is caused to flow upward. As a result, the data flows upward within the same program stack ST1.

Figure 7:
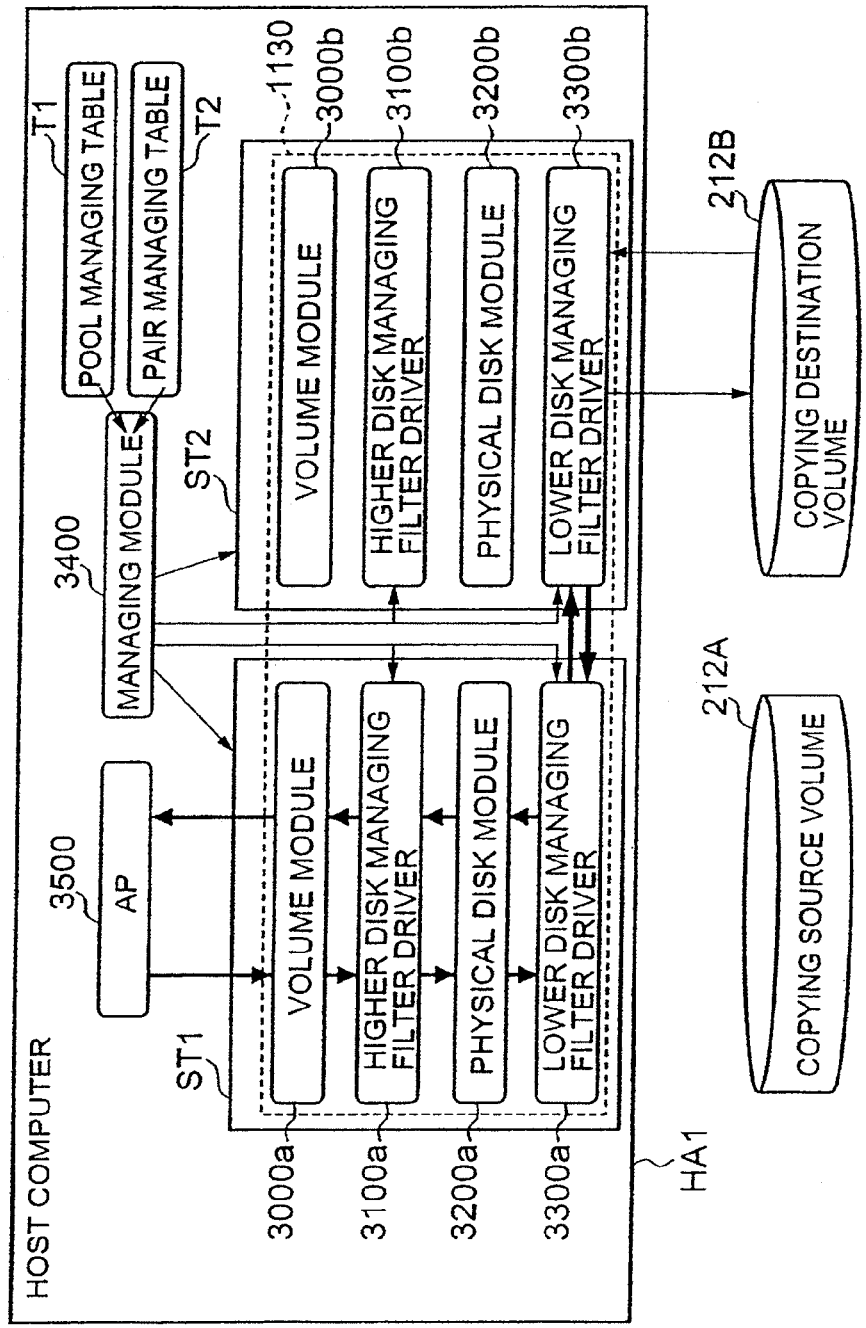
FIG. 7 shows an example of the cooperation in a case where the logical volume provided to the second AP 3500 in FIG. 6 is switched from the first volume to the second volume.

FIG. 7 shows an example of the cooperative action that is performed in a case where the logical volume provided to the second AP 3500 in FIG. 6 is switched from the first volume to the second volume.

In FIG. 6, in cases where the lower disk managing filter driver 3300a issues an I/O, if another lower disk managing filter driver 3300b is set as the I/O issuing lower driver data (see FIG. 13), an I/O request is sent to this driver 3300b. In this case, the driver 3300b similarly refers to the I/O issuing lower driver data in its own lower disk control information, and if the driver 3300b itself is set as this data, the driver 3300b issues an I/O request addressed to the volume 212B that corresponds to the driver 3300b itself.

Furthermore, in cases where the other lower disk managing filter driver 3300b receives data from the storage control system 20A, the driver 3300b refers to the lower disk control information that corresponds to the driver 3300b itself, and if the lower disk managing filter driver 3300a is set as the volume recognizing lower driver data, this received data is transferred to the lower disk managing filter driver 3300a.

In this case, the lower disk managing filter driver 3300a similarly refers to the volume recognizing lower driver data in its own lower disk control information, and if the driver 3300a itself is set as this data, the received data is transmitted to the higher physical disk module 3200 within the same program stack ST1.

Figure 8:
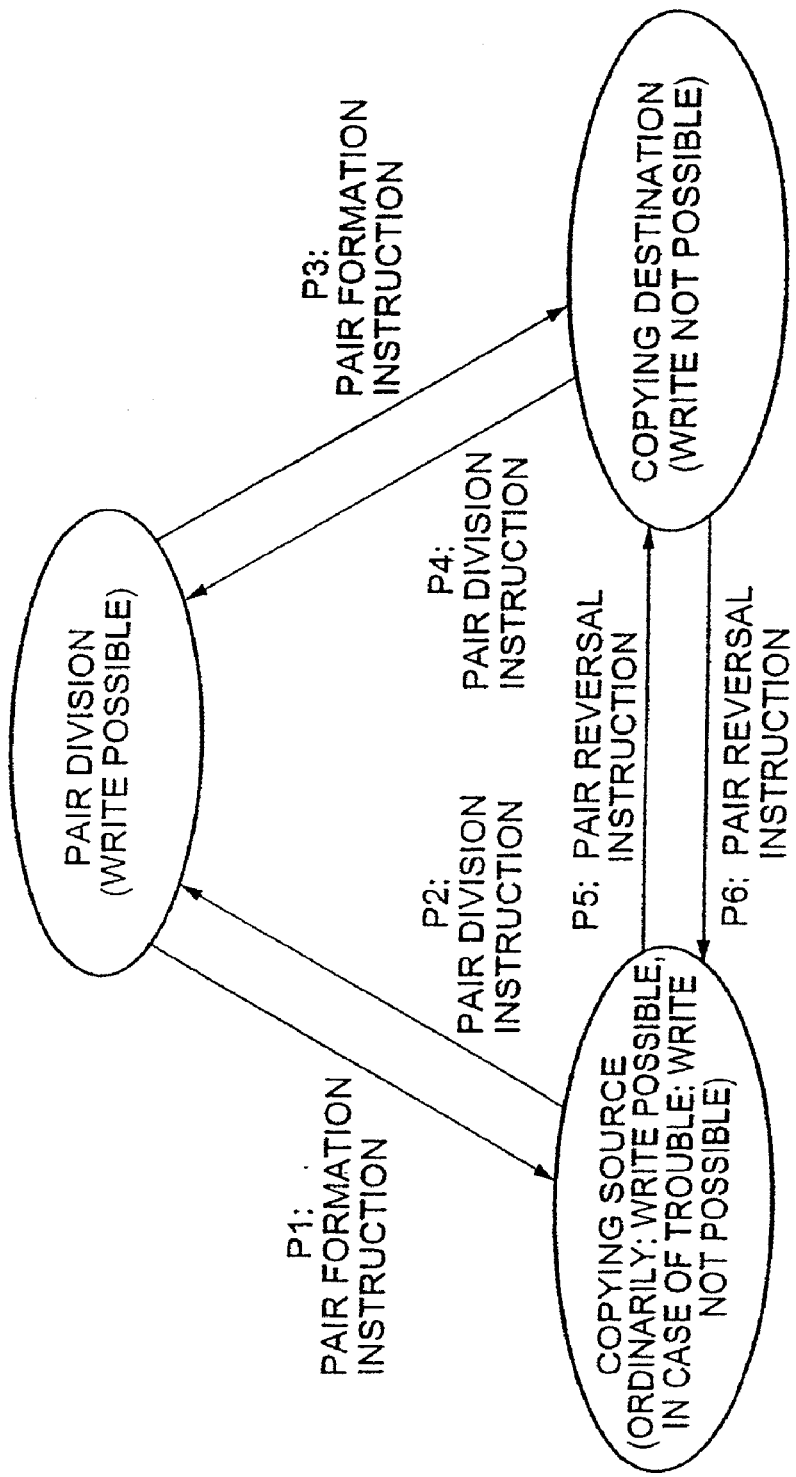
FIG. 8 is a state transition diagram which shows in model form the various pair states that can be assumed by the volumes, and the transitions between these respective pair states.

FIG. 8 is a state transition diagram which shows in model form the various pair state that can be adopted by the volumes, and the transitions between these respective pair states. As is shown in FIG. 8, three types of states, i.e., "pair division state", "copying source state" and "copying destination state", can be cited as pair states of the volumes that are the object of copying.

The "pair division state" refers to a state that is not the object of copying. In the case of a volume that is in the "pair division state", the host computer HA1 that is connected to this volume is capable of both read access and write access.

The "copying source state" is a state in which the volume is set as a copying source volume. In the case of a volume that is in the "copying source state", the host computer HA1 that is connected to this volume is capable of both read access and write access. When the memory contents of a volume that is set in the "copying source state" are updated, the memory contents of the volume that is set in the "copying source state" are also updated in synchronization with this.

The "copying destination state" is a state that forms a pair with the "copying source state". The updating of the volume that is set in a "copying source state" is synchronously reflected in the volume that is set in the "copying destination state". In the case of a volume that is set in the "copying destination state", write access from the host computer HA1 that is connected to this volume is impossible. Furthermore, read access to a volume that is set in the "copying destination state" may be permitted or prohibited.

Next, the transitions between the respective pair states will be described. Let us assume here that the initial state of the respective volumes that form a copying pair is the "pair division state". When a "pair formation instruction" is issued with regard to one of the two volumes that are in this "pair division state" (P1), this volume changes from the "pair division state" to the "pair source state". This volume acts as the pair source volume. Furthermore, the other volume that forms a pair with this copying source volume changes from the "pair division state" to the "copying destination state" (P3).

In the case of the volume that is set in the "pair source state", when a "pair division instruction" is issued from the host computer HA1 that is connected to this volume (P2), this volume changes from the "copying source state" to the "pair division state". At substantially the same time, the volume that is set in the "copying destination state" changes to the "pair division state". In the case of the volume that is set in the "copying destination state", a change similar to that described above is also caused to occur when a "pair division instruction" is issued (P4). Specifically, both the volume in the "copying destination state" an the volume in the "copying source state" change to the "pair division state".

The direction of copying is determined by the states that are set in the volumes. Write data is transferred from the volume that is set in the "copying source state" to the volume that is set in the "copying destination state". This direction of copying can be reversed by issuing a "pair reversal instruction".

In the case of the volume that is set in the "copying destination state", when a "pair reversal instruction" is issued from the host computer HA1 that is connected to this volume (P5), the volume changes from the "copying source state" to the "copying destination state". At the same time, the other volume of the pair changes from the "copying destination state" to the "copying source state". Similarly, in the case of the volume that is set in the "copying destination state", when a "pair reversal instruction" is issued from the host computer HA1 that is connected to this volume (P6), the volume in the "copying destination state" changes to the "copying source state", and the volume in the "copying source state" changes to the "copying destination state".

For example, such an alteration of the pair states can be executed by the managing module 3400.

Next, the processing that is performed in the present embodiment will be described in detail.

Figure 9:
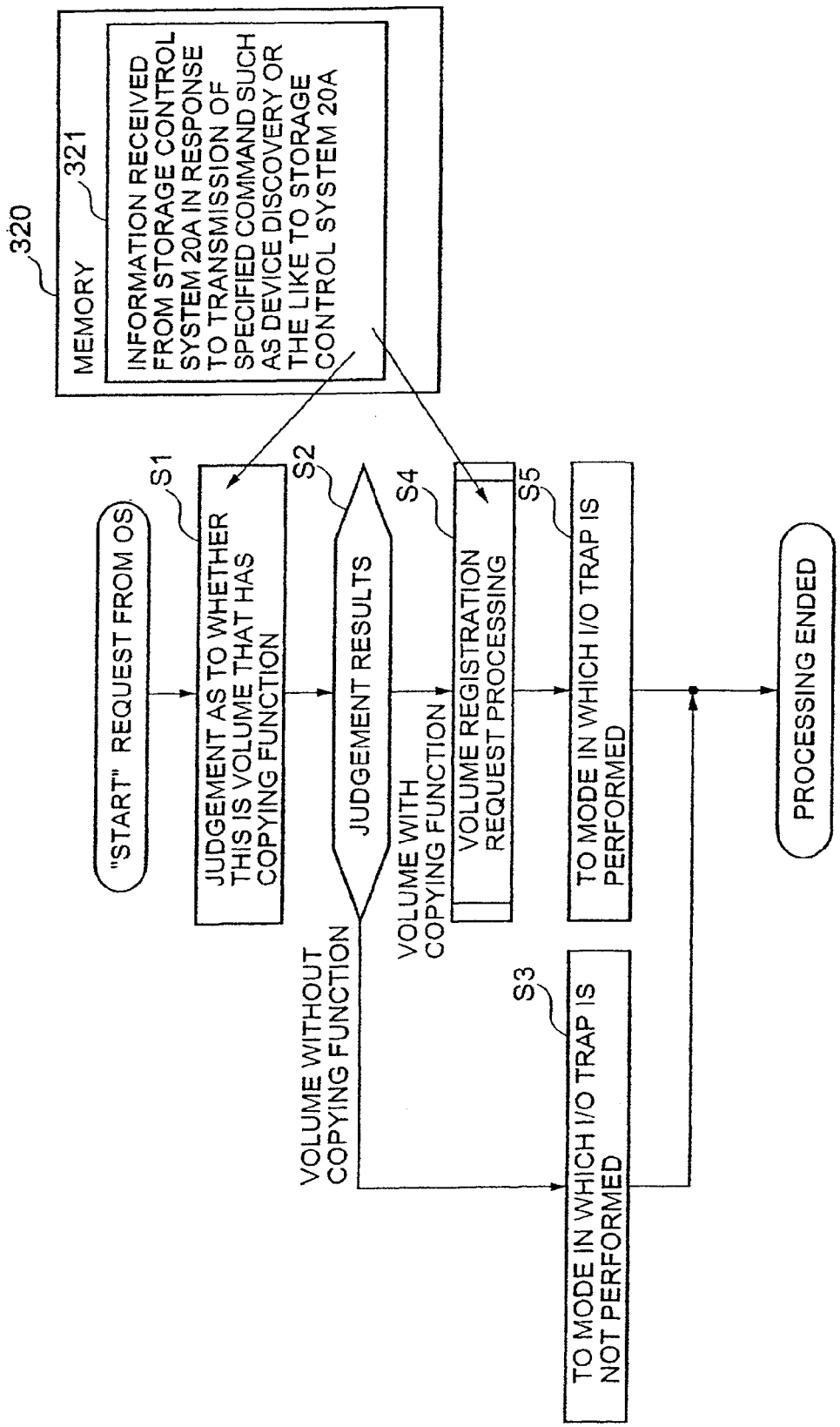
FIG. 9 shows one example of the flow of the processing that is performed by the lower disk managing filter driver.

FIG. 9 shows one example of the flow of the processing that is performed by the lower disk managing filter driver.

The lower disk managing filter driver 3300 receives a start request from the OS 1130 (e.g., the managing module 3400), and starts in the program stack ST designated by the managing module 3400. As a result of the following processing, for example, the managing module 3400 recognizes all of the logical volumes that can be accessed by the host computer HA1, prepares a program stack for each of the recognized logical volumes, and starts the sub-computer programs corresponding to the logical volume in this program stack.

For example, when the system is started, the OS 1130 transmits specified commands (e.g., device discovery commands based on an SCSI protocol) to the storage control system 20A (and/or the other storage control system 20B). In this case, in response to these commands, the host I/F 230 of the storage control system 20A acquires device information 321 that is recorded in the shared memory 260, and transmits this information to the host computer HA1. The OS-1130 of the host computer HA1 receives the device information 321 that is received from the storage control system 20A, and registers this information in the memory 320 (or other memory device).

For example, information concerning the maker or vendor of the storage control system 20A, and volume attribute information relating to all of the logical volumes possessed by the storage control system 20A (e.g., information indicating whether the volumes are volumes in the pool state or volumes that form a volume pair, and information indicating the pair state and the other volume of the pair in cases where the volume is a volume that forms a pair), are contained in the device information 321 as information relating to the storage control system 20A. By referring to this device information 321 (e.g., the volume information contained in this device information), the managing module 3400 can recognize all of the logical volumes that can be provided to the host computer HA1. Accordingly, the managing module 3400 can prepare a program stack ST for each of the recognized logical volumes, and can successively start sub-computer programs such as the lower disk managing filter driver 3300 and the like in each prepared program stack ST.

The lower disk managing filter driver 3300 that is called up (i.e., started) in the program stack ST judges whether or not the logical volume corresponding to the lower disk managing filter driver 3300 itself is a volume which has a copying function by a specified method such as referring to the device information 321 or the like (step S1). Here, for example, in cases where a specified code (e.g., a specified vendor name) is not included in the device information 321, the lower disk managing filter driver 3300 can judge that the volume is a volume that does not have a copying function; on the other hand, in cases where such a specified code is included, the lower disk managing filter driver 3300 can judge that the volume is a volume that does have a copying function.

In cases where it is judged that the volume is a volume that does not have a copying function by the judgement processing of step S1 ("volume without copying function" in S2), the OS 1130 shifts to a mode that does not perform an I/O trap for this logical volume (S3). Here, the term "I/O trap" refers to the switching of the transmission destination of the I/O requests output by the second AP 3500 from a volume that is actually recognized by the second AP 3500 (e.g., the copying source volume) to the other volume of the pair formed with this volume (e.g., the copying destination volume) in accordance with the state of the volume (e.g., according to whether or not a "utilizable" flag is raised). Furthermore, in this S3, for example, the started lower disk managing filter driver 3300 may be ended "as is". Specifically, there is no need to construct sub-computer programs in the program stacks ST corresponding to logical volumes that have been judged as having no copying function.

In cases where it is judged that the volume is a volume that does have a copying function as a result of the judgement processing of S1 ("volume with copying function" in S2), the lower disk managing filter driver 3300 executes volume registration request processing (S4). In concrete terms, for example, the lower disk managing filter driver 3300 transmits some or all of the volume attribute information relating to the logical volume that corresponds to the lower disk managing filter driver itself (e.g., information corresponding to the information items of the pool managing table T1 or pair managing table T2) to the managing module 3400.

Following S4, the OS 1130 shifts to a mode that performs an I/O trap for the logical volumes whose information is registered in the pool managing table T1 or pair managing table T2 (S5).

Figure 10:
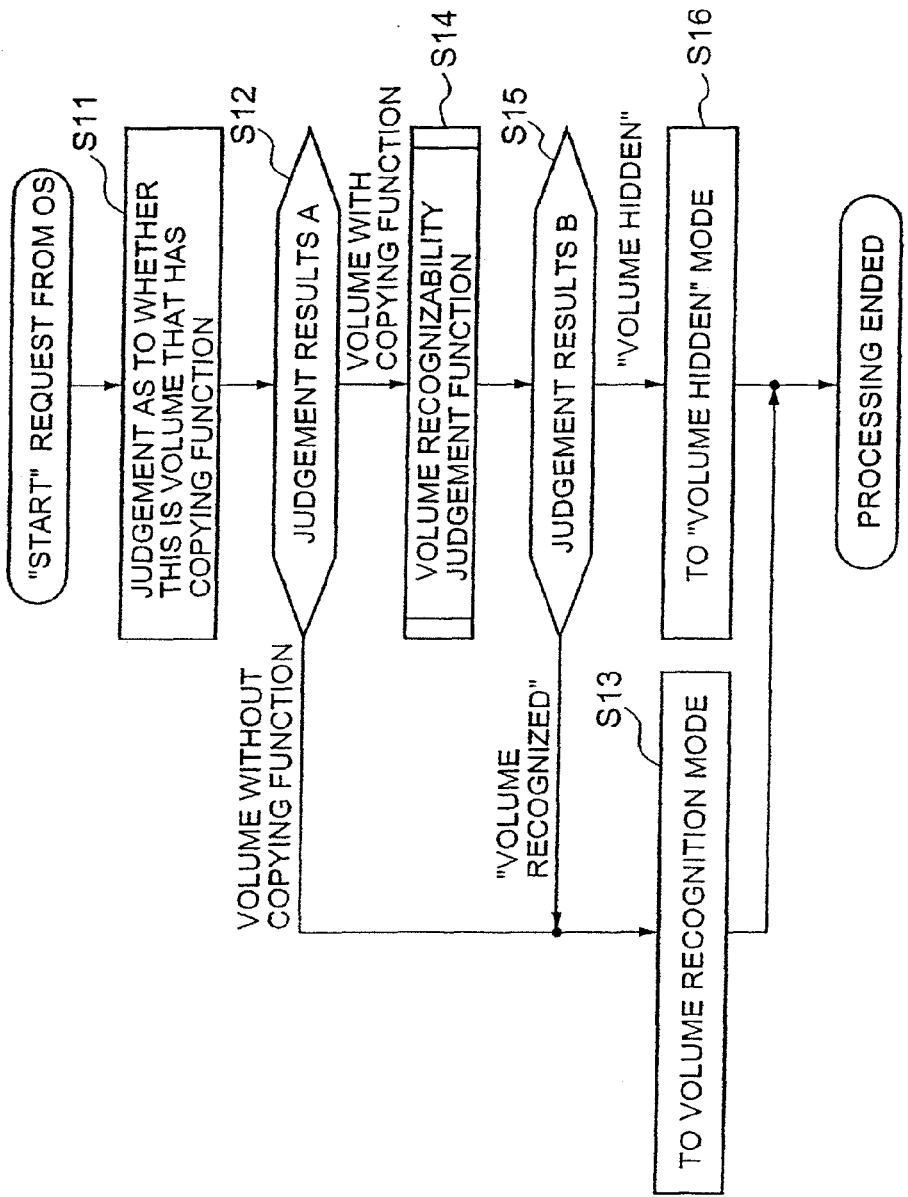
FIG. 10 shows one example of the flow of the operations that are performed by upper disk managing filter driver.

FIG. 10 shows one example of the operational flow of the higher disk managing filter driver.

For example, for the program stack ST of each volume that is recognized from the device information 321 by the managing module 3400, the higher disk managing filter driver 3100 also receives a start request. The higher disk managing filter driver 3100 judges whether or not the logical volume corresponding to the higher disk managing filter driver itself has a copying function by the same method as that used by the lower disk managing filter driver 3300 (S11).

In cases where it is judged that the volume is a volume that has no copying function as a result of the judgement of S11 ("volume without copying function" in S12), the OS 1130 executes a volume recognition mode in which the second AP 3500 is caused to recognize this logical volume (S13). Furthermore, in this S13, for example, the started higher disk managing filter driver 3100 may be ended "as is". Specifically, there is no need to construct sub-computer programs in the program stacks ST corresponding to logical volumes that have been judged as having no copying function.

In cases where it is judged that the volume is a volume that does have copying function as a result of the judgement of S11 ("volume without copying function" in S12), the higher disk managing filter driver 3100 executes volume recognizability judgment processing (S14). In concrete terms, for example, the higher disk managing filter driver 3100 transmits a specified request to the managing module 3400, and, on the basis of information received from the managing module 3400 in response to this request (e.g., a return value (described later)), either causes the second AP 3500 to recognize the logical volume that corresponds to the higher disk managing filter driver 3100 itself, or hides this logical volume with respect to the second AP 3500 (S15).

In cases where it is judged that the logical volume is to be recognized as a result of the judgement of S15 ("volume recognized" in S15), the processing of S13 is executed. In concrete terms, for example, when the higher disk managing filter driver 3100 receives "volume recognized" as the return value from the managing module 3400, the higher disk managing filter driver 3100 sets this value in a specified memory region (e.g., the memory 320), and, on the basis of this return value, performs a control action so that the module corresponding to the higher disk managing filter driver 3100 itself is shown to higher units (e.g., the volume module 3000).

On the other hand, in cases where it is judged that the logical volume is to be hidden as a result of the judgement of S15 ("volume hidden" in S15), a volume hiding mode in which the logical volume is hidden from the second AP 3500 is executed by the OS 1130 (S16). In concrete terms, for example, in cases where the higher disk managing filter driver 3100 receives "volume hidden" as the return value from the managing module 3400, this higher disk managing filter driver 3100 sets this return value in a specified memory region (e.g., the memory 320), and, on the basis of this return value, performs a control action so that the module corresponding to the higher disk managing filter driver itself is not shown to higher units (e.g., the volume module 3000).

Figure 11:
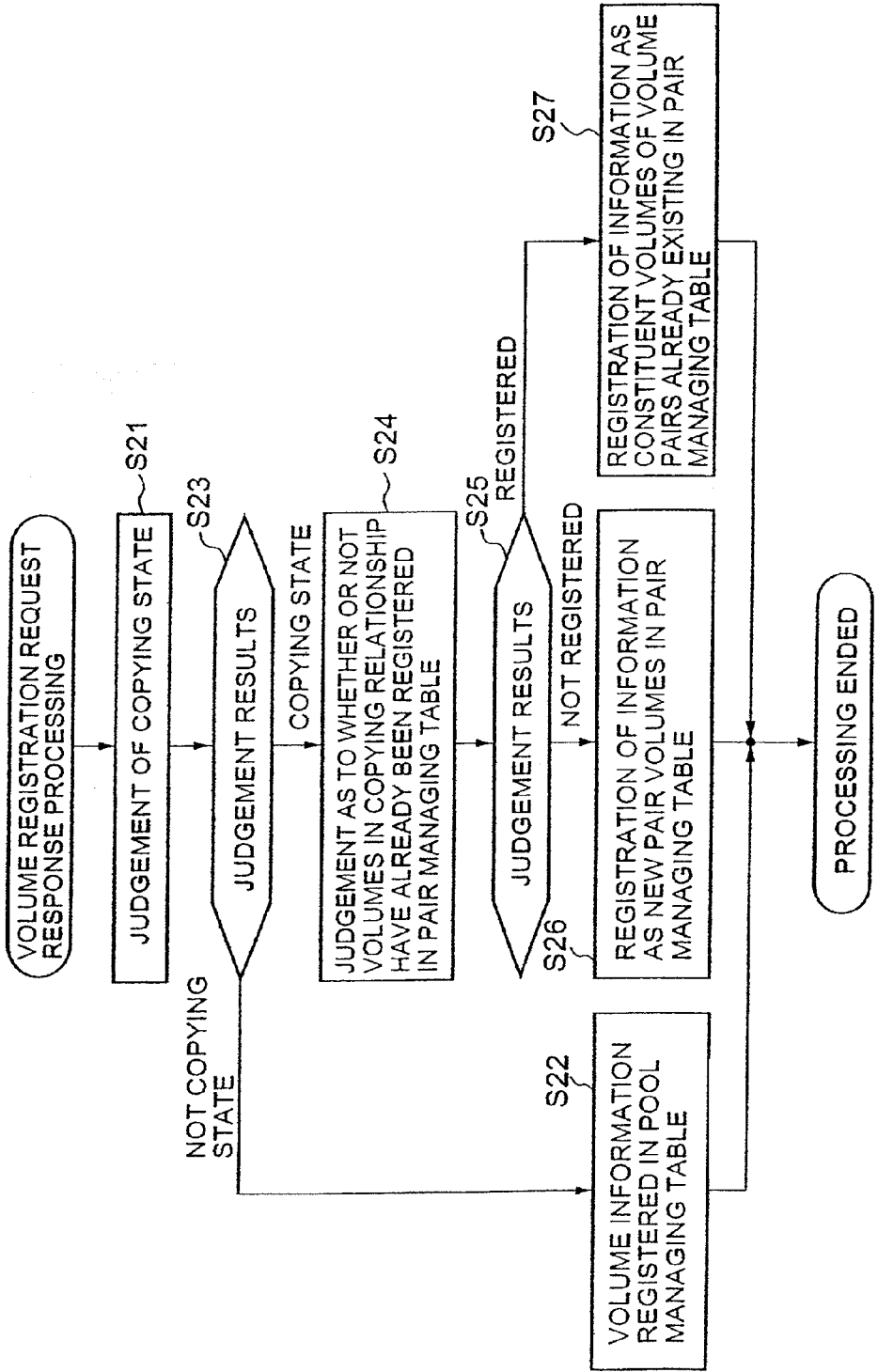
FIG. 11 shows one example of the flow of the volume registration request response processing that is performed by the managing module 3400.

FIG. 11 shows one example of the low of the volume registration request response processing that is performed by the managing module 3400.

The processing shown in this figure is performed in cases where some or all of the volume attribute information is received by the managing module 3400 from the lower disk managing filter driver 3300 as a result of the processing of S4 (see FIG. 9) that is performed by the lower disk managing filter driver 3300.

On the basis of the received volume attribute information, the managing module 3400 performs copying state judgement processing (S21). In this judgement processing, for example, the managing module 3400 judges that the state is not a copying state in cases where it is detected that information indicating a pair state is not contained in the volume attribute information, and on the other hand judges that the state is a copying state in cases where information indicating a pair state is contained in the volume attribute information.

In cases where it is judged that the state is not a copying state as a result of the judgement processing of S21 ("not copying state" in S23), the managing module 3400 registers the volume information that constitutes a portion of the received volume attribute information in the pool managing table T1.

In cases where it is judged that the state is a copying state as a result of the judgement processing of S21 ("copying state" in S23), the managing module 3400 makes a judgement as to whether or not information matching some or all of the received volume attribute information has already been registered in the pair managing table T2 (S24).

In cases where it is judged that information has not been registered as a result of the judgement of S24 ("not registered" in S25), the managing module 3400 registers some or all of the received volume attribute information in the pair managing table T2 as information relating to the new pair volumes (one volume constituting the volume pair) (S26). As a result of this processing, the new volume pair ID, as well as information relating to the volumes forming the volume pair to which this ID is assigned, is registered in the pair managing table T2 as a first or second volume information group. Furthermore, the volume information group in which the information is registered, i.e., either the first or second volume information group, may be selected (for example) in accordance with the content of the pair state. In concrete terms, for example, if the pair state is "copying source state", the managing module 3400 may register some or all of the volume attribute information as the first volume information group; moreover, if the pair state is "copying destination state", the managing module 3400 may register some or all of the volume attribute information as the second volume information group, and if the pair state is "pair division state", the managing module 3400 may register the info in an arbitrary volume information group.

In cases where it is judged that the information has been registered as a result of the judgement of S24 ("registered" in S25), the managing module 3400 registers some or all of the received volume attribute information in the pair managing table T2 as information relating to existing pair volumes (S27).

Figure 12:
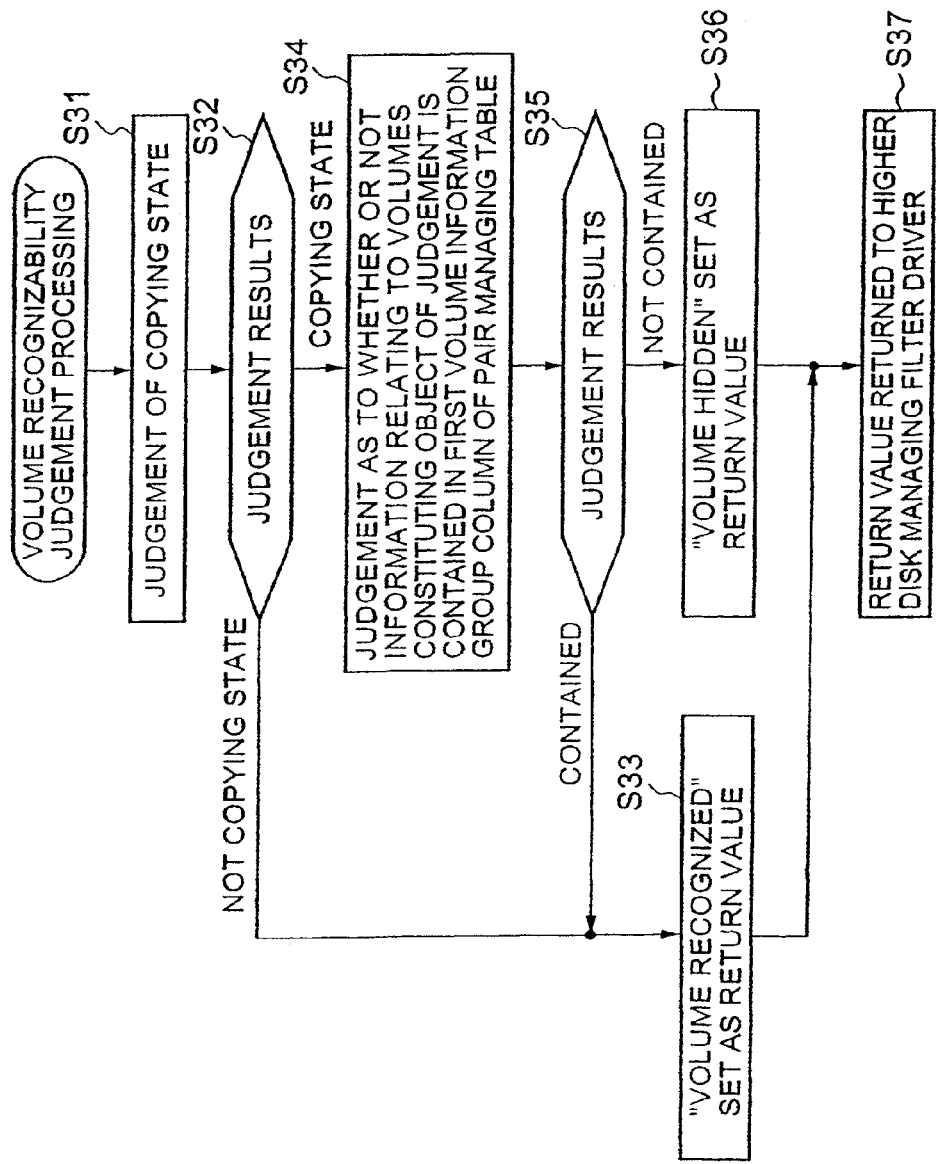
FIG. 12 shows one example of the flow of the volume recognizability judgement processing that is performed by the managing module 3400.

FIG. 12 shows one example of the flow of the volume recognizability judgement processing that is performed by the managing module 3400.

The processing shown in this figure is performed in cases where the managing module 3400 receives a specified request from the higher disk managing filter driver 3100 as a result of the processing of S14 (see FIG. 10) that is performed by the higher disk managing filter driver 3100.

The managing module 3400 refers to the pool managing table T1 and pair managing table T2, and performs copying state judgement processing for the object logical volumes that are the object of the processing shown in this figure (e.g., a volume corresponding to volume information containing the volume ID contained in the received request) (S31). In this judgement processing, for example, if information indicating a pair state is not found for the logical volume, the managing module 3400 judges that the state is not a copying state; on the other hand, if information indicating a pair state is found, the managing module 3400 judges that the state is a copying state.

In cases where it is judged that the state is not a copying state as a result of the judgement processing of S31 ("not copying state" in S32), the managing module 3400 sets a code indicating "volume recognized" as the return value that is transmitted to the higher disk managing filter driver 3100 (S33), and transmits this return value to the higher disk managing filter driver 3100 (S37).

In cases where it is judged that the state is a copying state as a result of the judgement processing of S31 ("copying state" in S32), the managing module 3400 makes a judgement as to whether or not information relating to the object logical volume has been registered in the first volume information group column of the pair managing table T2 (S34).

If the judgement results of S34 are affirmative ("contained" in S35), the managing module 3400 executes the processing of the S33 and S37.

On the other hand, if the judgement results of S34 are negative ("not contained" in S35), the managing module 3400 sets a code that indicates "volume hidden" as the return value that is transmitted to the higher disk managing filter driver 3100 (S36), and transmits this return value to the higher disk managing filter driver 3100 (S37).

As a result of the flow, the option of whether or not a lower disk managing filter driver 3300 and higher disk managing filter driver 3100 are constructed in the respective program stacks prepared for each volume is controlled.

Furthermore, the two lower disk managing filter drivers 3300a and 3300b respectively corresponding to the two volumes that make up the volume pair hold the lower disk control information, and control the transmission of data on the basis of this lower disk control information.

FIG. 13 shows an example of the construction of the lower disk control information.

Volume recognizing lower device data and I/O issuing lower device data are contained in the lower disk control information 25.

The volume recognizing lower device data is information that is used to specify the lower disk managing filter driver 3300 recognizes the volume; for example, this information is the name of the lower disk managing filter driver 3300. For example, by referring to this volume recognizing lower device data, it is possible to discriminate which of the two lower disk managing filter drivers 3300a and 3300b is to transmit the volume to the higher device.

The I/O issuing lower device data is information that is used to specify the lower disk managing filter driver 3300 that issues an I/O request to the volume. For example, this information is the name of the lower disk managing filter driver 3300. By referring to this I/O issuing lower device data, it is possible to discriminate which of the two lower disk managing filter drivers 3300a and 3300b is to issue an I/O request to the lower device.

Processing that switches the volume that is recognized by the second AP 3500 between the copying source volume and the copying destination volume can be performed on the basis of this lower disk control information 25. The flow of the processing that is performed until the lower disk control information 25 is reflected in the OS 1130 will be described below.

Figure 14:
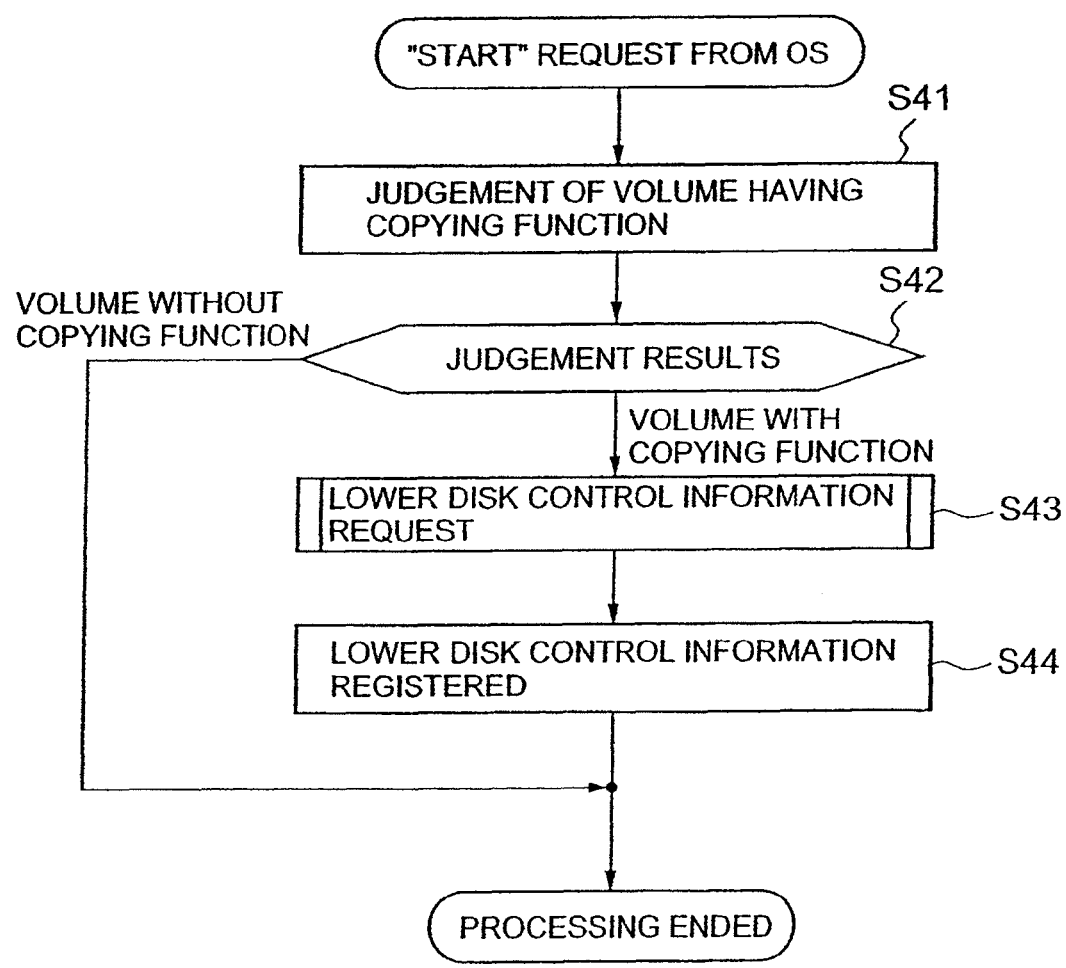
FIG. 14 shows one example of the flow of the processing that is performed by the lower disk managing filter driver 3300 in order to register to the lower disk control information 25.

FIG. 14 shows one example of the flow of the processing that is performed by the lower disk managing filter driver 3300 in order to register the lower disk control information 25.

The lower disk managing filter driver 3300 receives a volume utilization start request from the OS 1130 (e.g., the managing module 3400), and executes the processing of S41 below. Specifically, the lower disk managing filter driver 3300 judges whether or not the logical volume corresponding to the lower disk managing filter driver itself has a copying function by the same method as in S1 (see FIG. 9) (S41).

In cases where it is judged that the volume is a volume that does not have a copying function as a result of the judgement processing of S41 ("volume without copying function" in S42), the lower disk managing filter driver 3300 ends the processing.

In cases where it is judged that the volume is a volume that does have a copying function as a result of the processing of S41 ("volume with copying function" in S42), the lower disk managing filter driver 3300 executes lower disk control information request processing (S43). In concrete terms, for example, the lower disk managing filter driver 3300 requests lower disk control information from the managing module 3400, and receives lower disk control information from the managing module 3400 in response to this request. Subsequently, the lower disk managing filter driver 3300 registers the received lower disk control information in a specified memory region (e.g., the memory 320) (S44).

Figure 15:
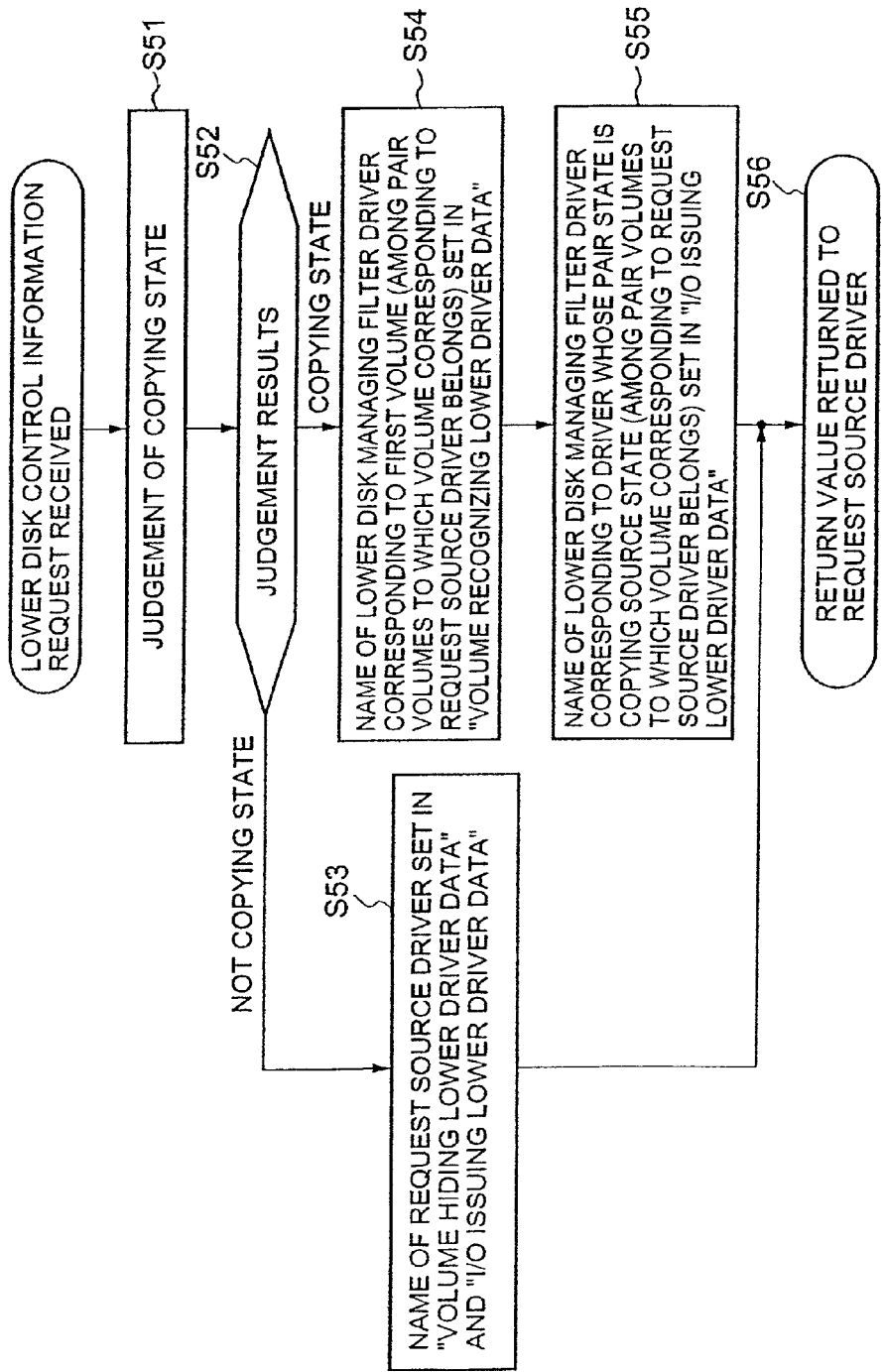
FIG. 15 shows one example of the flow of the processing that is performed by the managing module 3400 in response to requests for lower disk control information.

FIG. 15 shows one example of the flow of the processing that is performed by the managing module 3400 in response to the request for lower disk control information.

The managing module 3400 manages the names of the corresponding lower disk managing filter drivers 3300 for each program stack ST (i.e., for each logical volume) in a specified memory region (e.g., the memory 320).

The managing module 3400 judges the copying state of the volume corresponding to the lower disk managing filter driver 3300 that requested the lower disk control information (hereafter referred to as the "request source driver 3300") by the same method as in S21 (see FIG. 11) or S31 (see FIG. 12) (S51). Furthermore, for example, by managing the name of the lower disk managing filter driver 3300 corresponding to the volume specified for each volume ID from this ID in a specified memory region (e.g., the memory 320), the managing module 3400 can specify the volume corresponding to the request source driver 3300.

In cases where it is judged that the state is not a copying state as a result of the judgement of S51 ("not copying state" in S52), the managing module 3400 sets the name of the request source driver 3300 in both the "volume recognizing lower driver data" and "I/O issuing lower driver data" of the lower disk control information (S53). As a result, in cases where the volume corresponding to the request source driver 3300 is not in a copying state, both the device 3300 that transmits the volume upward and the device 3300 that issues the I/O request downward are the same. In other words, in cases where the volume corresponding to the request source driver 3300 is not in a copying state, switching of the volume that is recognized by the second AP 3500 is not performed.

In cases where it is judged that the state is a copying state as a result of the judgement of S51 ("copying state" in S52), the managing module 3400 specifies the first volume of the pair volumes to which the volume corresponding to the request source driver 3300 belongs (i.e., the volume that corresponds to the information registered in the first volume information group column) by referring to the pair managing table T2, and sets the name of the lower disk managing filter driver 3300 corresponding to the specified first volume in the "volume recognizing lower driver data" of the lower disk control information (S54). Furthermore, the managing module 3400 specifies the copying source volume (the volume whose pair state is a copying source state) among the pair volumes to which the volume corresponding to the request source driver 3300 belongs by referring to the pair managing table T2, and sets the name of the lower disk managing filter driver 3300 that corresponds to the specified copying source volume in the "volume recognizing lower driver data" of the lower disk control information (S55). As a result of the processing of S54 and S55, the lower disk managing filter driver 3300 corresponding to the volume that is recognized by the second AP 3500 is set as the lower disk managing filter driver 3300 that transmits the volume upward, and the lower disk managing filter driver 3300 that corresponds to the copying source volume in which not only reading but also writing of data is allowed is set as the lower disk managing filter driver 3300 that issues I/O requests downward.

Specifically, following the processing of S53 or S55, if the name is set in both the "volume recognizing lower driver data" and "I/O issuing lower driver data" of the lower disk control information, the managing module 3400 transmits the lower disk control information in which the setting of the name has been completed to the request source driver 3300 as the return value (S56).

As a result of the processing shown in FIGS. 14 and 15 above, the respective lower disk managing filter drivers 3300 corresponding to the respective logical volumes can receive lower disk control information from the managing module 3400, and can register this information in a specified memory region (e.g., the memory 320). Subsequently, when an I/O request is received, the respective lower disk managing filter drivers 3300 execute the processing described below.

Figure 16:
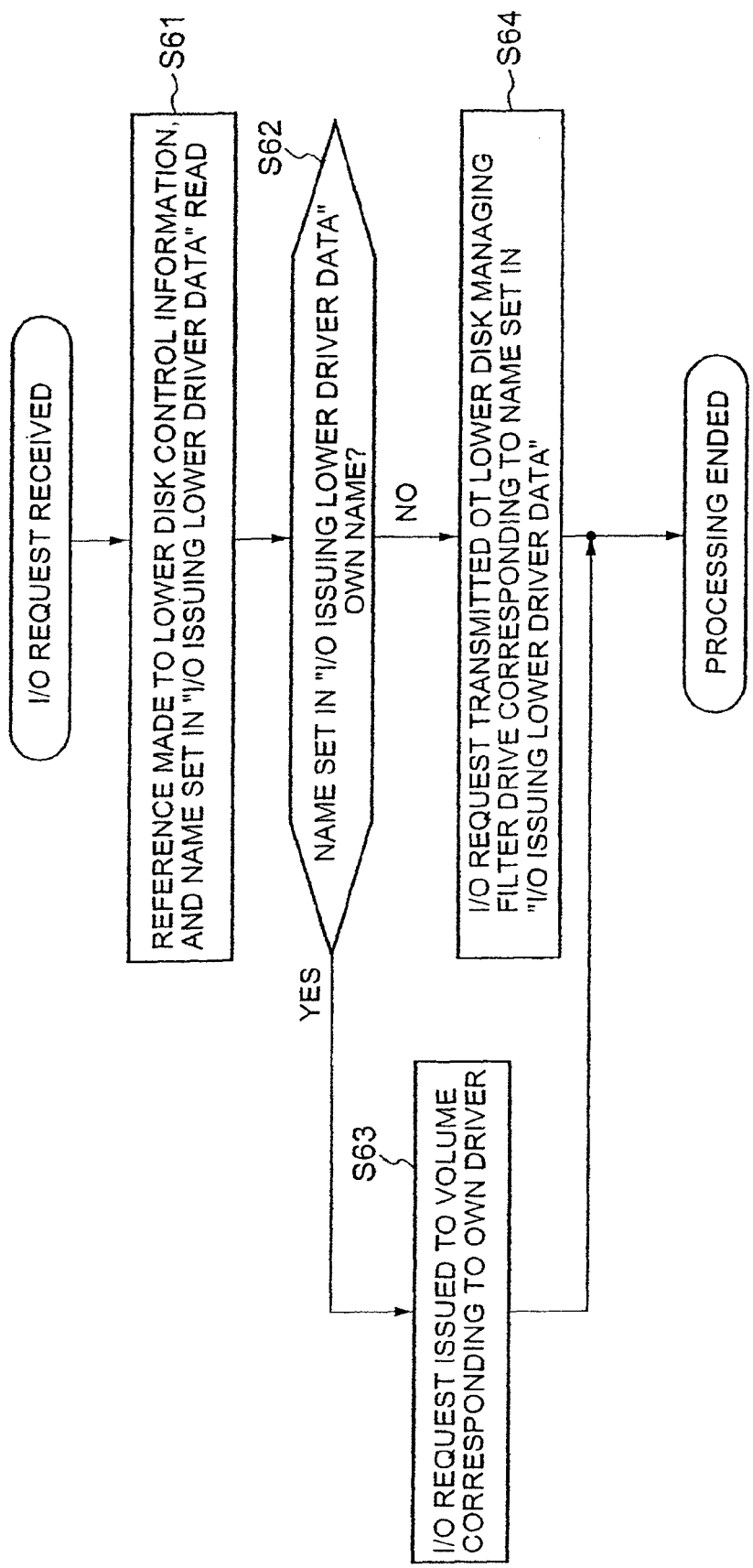
FIG. 16 shows one example of the flow of the processing that is performed by the lower disk managing filter driver 3300 that has received an I/O request.

FIG. 16 shows one example of the flow of the processing that is performed by the lower disk managing filter driver 3300 that has received an I/O request.

The lower disk managing filter driver 3300 receives I/O requests from the physical disk module 3200 that is present above the lower disk managing filter driver 3300 itself, or from other lower disk managing filter drivers 3300. In this case, the lower disk managing filter driver 3300 refers to the name that is set in the "I/O issuing lower driver data" contained in the lower disk control information that is registered in the specified memory region (S61), and judges whether or not this name is its own name (S62).

If the judgement results of S62 are affirmative (YES in S62), then the lower disk managing filter driver 3300 issues an I/O request to the volume that corresponds to the lower disk managing filter driver 3300 itself (S63). Here, for example, the lower disk managing filter driver 3300 issues an I/O request that has volume information for the destination volume (information that is recorded in the pool managing table T1 or pair managing table T2, e.g., the access path name) under the control of the managing module 3400. As a result, the I/O request is transmitted to the storage control system 20A, and data is read out from the volume, or is written into the volume.

If the judgement results of S62 are negative (NO in S62), then the lower disk managing filter driver 3300 transmits the received I/O request to another lower disk managing filter driver 3300 that corresponds to the name that is set in the "I/O issuing lower device data" (S64).

When the storage control system 20A receives an I/O request from the host computer HA1, the storage control system 20A attempts to execute processing in accordance with this I/O request, i.e., attempts to read out data from the volume that is the object of the I/O request, or to write data into this volume. In cases where the storage control system 20A succeeds in this attempt, and is able to read or write data, the storage control system 20A returns a return value of "successful" to the host computer HA1 as a response to the I/O request. On the other hand, in cases where the storage control system 20A fails in this attempt (e.g., in the case of a busy state), the storage control system 20A returns a return value of "failure" to the host computer HA1 as the response to the I/O request.

Figure 17:
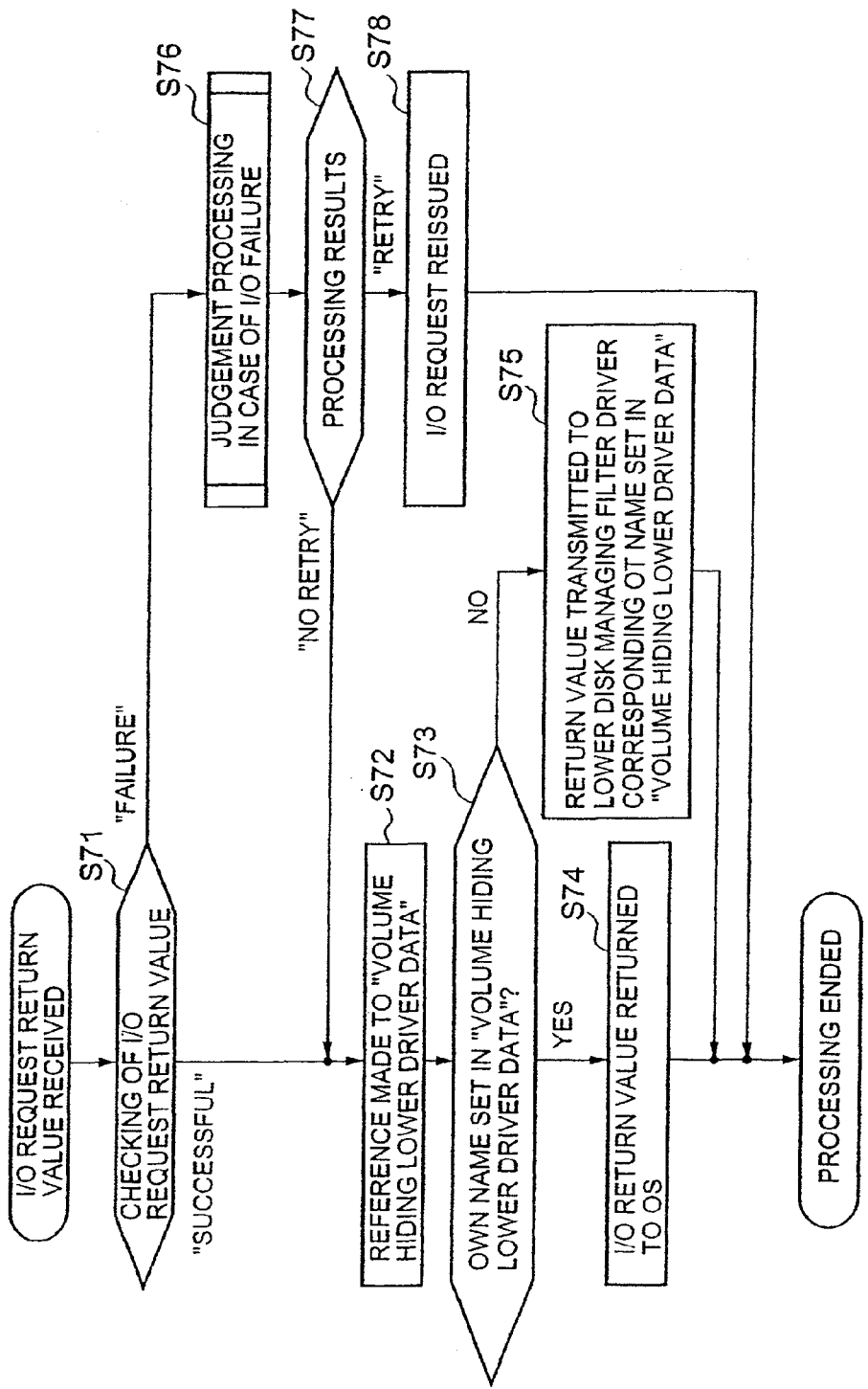
FIG. 17 shows one example of the flow of the processing that is performed by the lower disk managing filter driver 3300 that has received the return value of an I/O request from the storage control system 20A.

FIG. 17 shows one example of the flow of the processing that is performed by the lower disk managing filter driver 3300 that has received the return value of an I/O request from the storage control system 20A.

The lower disk managing filter driver 3300 receives the return value of an I/O request from the storage control system 20A or from another lower disk managing filter driver 3300. The lower disk managing filter driver 3300 checks the received return value (S71).

In cases where it is confirmed that the return value is "successful" in S71 ("successful" in S71), the lower disk managing filter driver 3300 refers to the name that is set in the "volume recognizing lower device data" contained in the lower disk control information that is registered in the specified memory region (S72), and judges whether or not this name is its own name (S73).

If the judgement results of S73 are affirmative (YES in S73), the lower disk managing filter driver 3300 transmits the received return value of "successful" to the OS 1130 (e.g., to the physical disk module 3200 that is a sub-computer program above the lower disk managing filter driver itself) (S74).

If the judgement results of S73 are negative (NO in S73), the lower disk managing filter driver 3300 transmits the received return value of "successful" to another lower disk managing filter driver 3300 that corresponds to the name set in the "volume recognizing lower device data" (S75).

In cases where a return value of "failure" is confirmed in S71 ("failure" in S71), the lower disk managing filter driver 3300 requests that the managing module 3400 perform I/O failure judgement processing (S76). In response to this request, the managing module 3400 performs I/O failure judgement processing, and, in cases where a return value of "no retry" is received as a result ("no retry" in S77), the lower disk managing filter driver 3300 executes the processing of S72. On the other hand, in cases where a return value of "retry" is received ("retry" in S77), the lower disk managing filter driver 3300 performs I/O request reissuing (S78). Here, for example, the lower disk managing filter driver 3300 temporarily holds the I/O request issued in S63 or S64 (see FIG. 16) in a specified memory region (e.g., the memory 320), and reads out and issues this held I/O request in S78. In cases where a return value of "successful" is confirmed in S71, the lower disk managing filter driver 3300 may delete the held I/O request.

Figure 18:
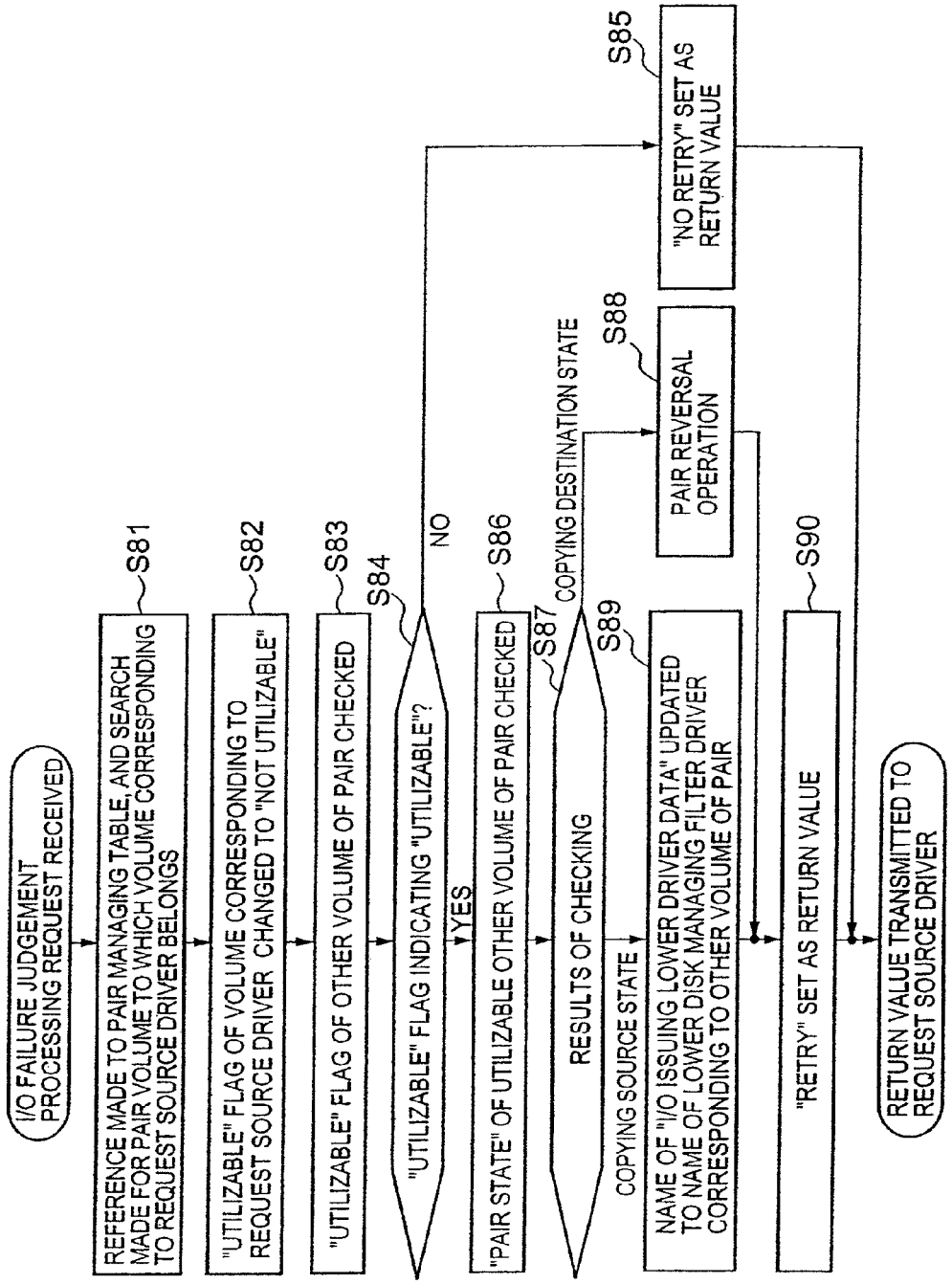
FIG. 18 shows one example of the flow of the processing that is performed by the managing module 3400 that has received a request to perform I/O failure judgement processing from the lower disk managing filter driver 3300.

FIG. 18 shows one example of the flow of the processing that is performed by the managing module 3400 that has received a request to perform I/O failure judgement processing from the lower disk managing filter driver 3300.

The managing module 3400 refers to the pair managing table T2, and performs a search in order to ascertain the pair volumes to which the volume corresponding to the request source driver for the I/O request failure judgement processing belongs (S81). Furthermore, the volume that corresponds to the request source driver 3300 can be discriminated by the managing module 3400 (for example) by managing the respective volume IDs and the names of the lower disk managing filter drivers 3300 that correspond to these IDs in a specified memory region (e.g., the memory 320).

When the pair volumes that correspond to the request source driver 3300 are found by the managing module 3400, the "utilizable" flag of these pair volumes is altered to "not utilizable" (i.e., is lowered) (S82).

Next, the managing module 3400 specifies the other volume of the pair that forms the volume pair together with the found pair volume from the pair managing table T2, and checks the "utilizable" flag of this specified other volume of the pair (S83).

In cases where the managing module 3400 confirms in S83 that the "utilizable" flag is lowered (i.e., that the other volume of the pair is not utilizable) (NO in S84), "no retry" is set as the return value that is returned to the request source driver 3300 (S85), and this return value of "no retry" is transmitted to the request source driver 3300. As a result, a return value of "failure" is transmitted to the OS 1130 (e.g., the physical disk module 3200 above the request source driver 3300) by the request source driver 3300 via the processing from S77, and S72 and subsequent steps (see FIG. 17).

In cases where it is confirmed by the managing module 3400 in S83 that the "utilizable" flag is raised (i.e., that the other volume of the pair is utilizable) (YES in S84), the managing module 3400 refers to the pair managing table T2, and checks the pair state of the other volume of the pair (S86).

In cases where it is judged by the managing module 3400 that the pair state is the "copying destination state" in S86 ("copying destination state" in S87), the managing module 3400 performs a pair reversal operation (S88). In concrete terms, for example, the managing module 3400 alters the pair state of the other volume of the pair from the copying destination state to the copying source state, and alters the pair state of the volume found in S81 (i.e., the pair partner of the other volume of the pair) from the copying source state to the copying destination state. Furthermore, in this processing of S88, for example, the managing module 3400 may make a judgement as to whether or not a pair reversal operation is possible, and may perform such an operation only in cases where affirmative judgement results are obtained. For example, judgement results indicating that a pair reversal operation is possible may be obtained in cases where no data has been written into the volume found in S81 (i.e., the current copying source volume), and judgement results indicating that such an operation is impossible may be obtained (for example) in cases where data is being written into this volume.

In cases where the managing module 3400 judges that the pair state is the "copying source state" in S86 ("copying source state" in S87), the name of the "I/O issuing lower driver data" in the lower disk control information is updated to the name of the lower disk managing filter driver 3300 that corresponds to the other volume of the pair (S89).

Following the processing of S88 or S89, the managing module 3400 sets "retry" as the return value that is returned to the request source driver 3300 (S90), and transmits this return value of "retry" to the request source driver 3300. As a result, the processing of S78 is performed by the request source driver 3300. Specifically, the I/O request is assigned to another lower disk managing filter driver 3300 (the lower disk managing filter driver 3300 corresponding to the other volume of the pair) whose name has been written in S89.

Thus, program stacks are prepared for each of the respective volumes, and sub-computer programs are called up and constructed in each program stack; however, the one or plurality of sub-computer programs that are constructed in the program stacks (or the program stacks themselves) can be deleted by the following flow. This flow will be described with reference to FIGS. 19 and 20. Furthermore, the following deletion processing is performed (for example) in cases where the "utilizable" flags of a plurality of volumes that are managed so as to be recognized as a single volume by the second AP 3500 all indicate "not utilizable" (e.g., in cases where this is detected by the managing module 3400), by the transmission of a deletion request to the plurality of lower disk managing filter drivers that respectively correspond to the plurality of volumes.

Figure 19:
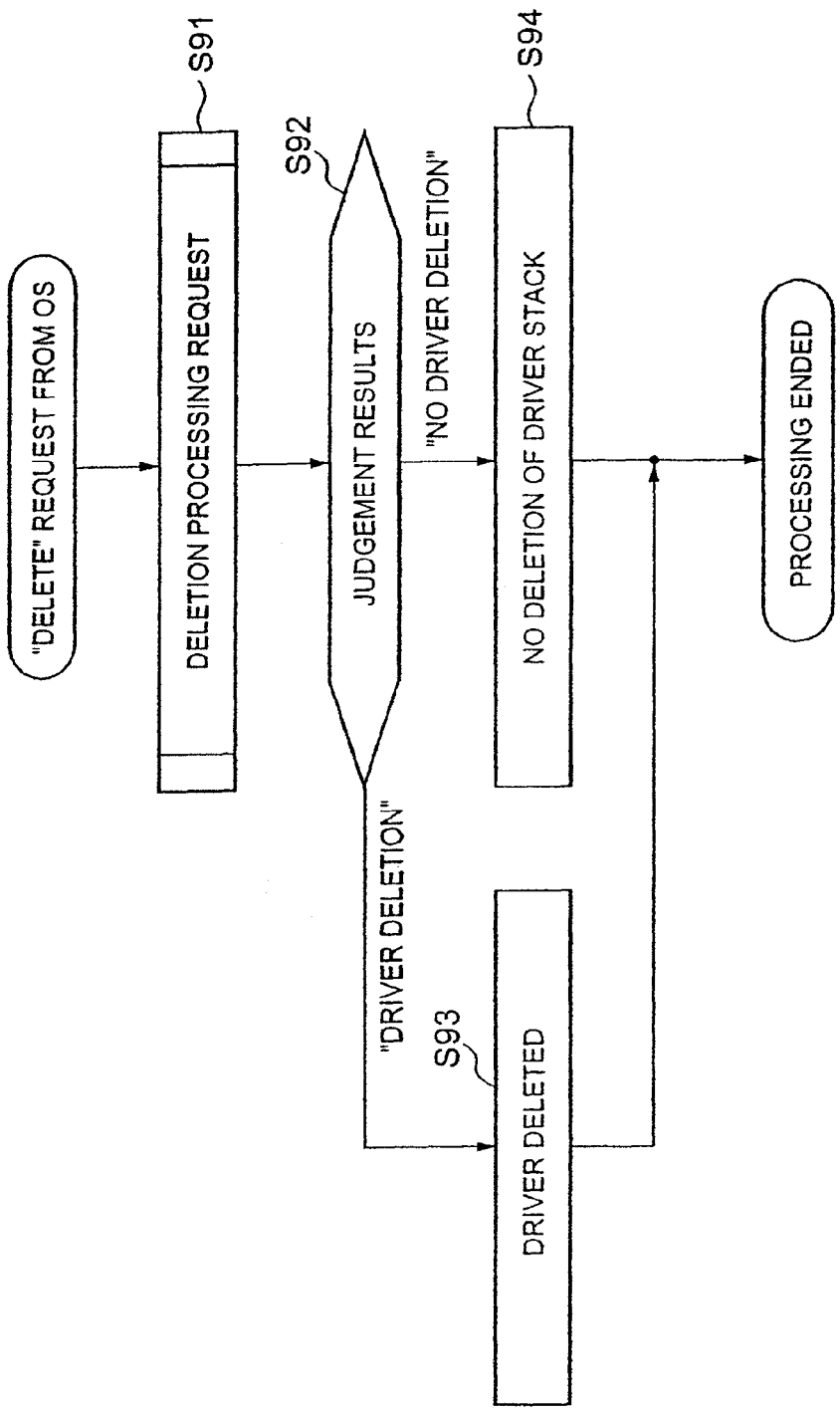
FIG. 19 shows the flow of processing of the lower disk managing filter driver 3300 that deletes this lower disk managing filter driver 3300.

FIG. 19 shows the flow of the processing of the lower disk managing filter driver 3300 that has received a deletion request.

In cases where the lower disk managing filter driver 3300 receives a deletion request from the OS 1130 (e.g., the managing module 3400 or another lower disk managing filter driver 3300), the lower disk managing filter driver 3300 requests deletion processing from the managing module 3400 (S91). In response to this request, deletion processing (described later) is performed by the managing module 3400, and the lower disk managing filter driver 3300 receives a return value of "driver deletion" or "no driver deletion" from the managing module 3400.

In cases where the lower disk managing filter driver 3300 judges that the received return value indicates "driver deletion" ("driver deletion" in S92), this driver 3300 (or the program stack itself that has this driver 3300) is deleted (S93). On the other hand, in cases where the lower disk managing filter driver 3300 judges that the received return value indicates "no driver deletion" ("no driver deletion" in S92), the processing is ended without deleting the driver 3300 (or the program stack itself that has this driver 3300) (S94).

FIG. 20 shows one example of the flow of the processing performed by the managing module 3400 that has received a request for deletion processing.

The managing module 3400 refers to the pair managing table T2, and performs a search in order to ascertain the pair volumes to which the volume corresponding to the request source driver of the I/O failure judgement processing belongs (S101).

When the managing module 3400 finds the pair volumes that correspond to the request source driver 3300, the "utilizable" flag of these pair volumes is altered to "not utilizable" (S102).

Next, the managing module 3400 specifies the other volume of the pair that forms a volume pair with the found pair volume from the pair managing table T2, and checks the "utilizable" flag of this specified other volume of the pair (S103).

In cases where the managing module 3400 confirms that the "utilizable" flag is raised (i.e., that the other volume of the pair is utilizable) in S103 (YES in S104), "no driver deletion" is set as the return value in that is returned to the request source driver 3300 (S105), and this return value of "no driver deletion" is transmitted to the request source driver.

In cases where the managing module 3400 confirms that the "utilizable" flag is lowered (i.e., that the other volume of the pair is not utilizable) in S103 (NO in S104), the deletion request is transmitted to another lower disk managing filter driver 3300 corresponding to the other volume of the pair (S106). As a result, the processing shown in FIG. 19 is performed in this other lower disk managing filter driver 3300.

Following S106, the managing module 3400 sets "driver deletion" as the return value that is returned to the request source driver 3300 (S107), and transmits this return value of "driver deletion" to the request source driver 3300.

Thus, in the example described above, in the host computer HA1, the copying source volume and copying destination volume are caused to be recognized as a single volume in virtual terms by the second AP 3500 that is present above the OS 1130.

Example 2

Figure 21A:
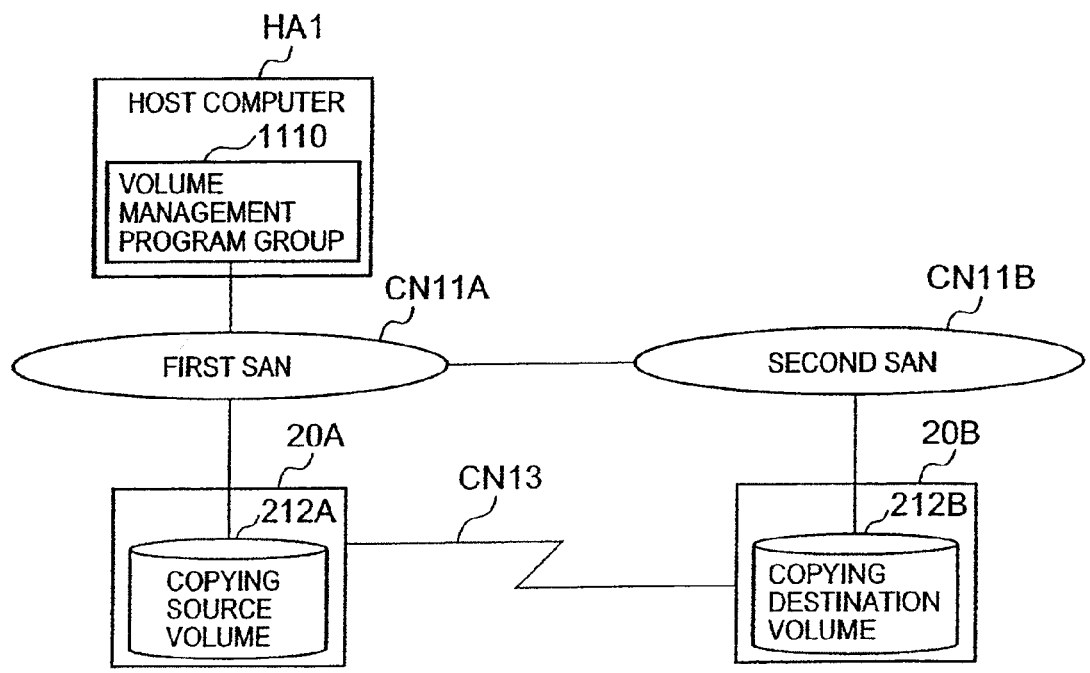
FIG. 21A shows an overall outline of a storage system constituting a second example of an embodiment of the present invention.

FIG. 21A shows the overall schematic concept of a storage system constituting a second example of an embodiment of the present invention. This second example will be described with reference to this FIG. 21A and the FIG. 2.

This second example is an example of a case in which the present embodiment is used for remote copying, i.e., the copying of data from the copying source volume inside the first storage control system 20A to a copying destination logical volume inside another (e.g., remote) storage control system 20B that is separate from the storage control system 20A.

To give a brief description of remote copying, logical volumes that constitute the object of synchronization are selected beforehand from the plurality of logical volumes 212 belonging to the storage device system 20A and the plurality of logical volumes 212 belonging to the storage device system 20B. In these selected pairs of logical volumes 212, one logical volume is the copying source volume 212A, while the other logical volume is the copying destination volume 212B. The data (updated data) that is written into the copying source volume from the host computers H is transferred to the copying destination volume 212B via the remote copying line CN13 from the inter-device I/F 240, and is written into the copying destination volume 212B.

Furthermore, when remote copying is stopped, the data that is written into the copying source volume 212A is managed as difference data. For example, the difference data can be managed using a difference bit map table or the like. When remote copying is restarted, the difference data is first transferred to the copying destination volume 212B from the copying source volume 212A, so that re-synchronization of the respective volumes is performed. This second example will be described in detail below.

In a case where a logical volume 212 into which data has been written from the host computer HA 1 is set as the copying source volume 212A, this write data is transferred to the storage control system 20B that has the copying destination volume 212B via the remote copying line CN13 from the inter-device I/F 240. When the storage device system 20B that is the transfer destination receives the write data via the inter-device I/F, this write data is stored in the cache memory, and the completion of writing is reported to the transfer source storage control system 20A. After reporting the completion of writing, the transfer destination storage control system 20B writes the write data into the copying destination volume 212B at an appropriate timing.

After confirming that the completion of writing has been reported from the transfer destination storage control system 20B, the host I/F 230 of the transfer source storage control system 20A reports the completion of writing to the host computer H. A method in which the completion of writing is thus reported to the host computer H after waiting for a report of the completion of writing from the transfer destination storage control system 20B is called synchronous remote copying.

On the other hand, a method in which the completion of writing is reported to the host computer H at the point in time at which the transfer source storage control system 20A stores the write data from the host computer H in the cache memory 250 is called asynchronous remote copying. In the case of synchronous remote copying, the processing time is increased by an amount corresponding to the waiting time for a response from the transfer destination. However, since the completion of writing is reported to the host computer H after it has been confirmed that transfer has been normally completed, it can be ensured that the copying source volume 212A and copying destination volume 212B are synchronized. In the case of asynchronous remote copying, since the completion of writing is reported to the host computer H prior to the transfer of the write data to the other storage control system 20B, the response time can be shortened; however, since no check is made as to whether or not the memory content of the copying source volume 212A has been updated, it cannot be reliably ensured that remote copying has been completed in a normal manner.

Thus, two methods of remote copying, i.e., synchronous remote copying and asynchronous remote copying, can be performed. Thus, the embodiment can also be applied in cases where remote copying is performed.

Furthermore, the construction of the storage system that can perform remote copying is not limited to the construction shown in FIG. 21A.

Figure 21B:
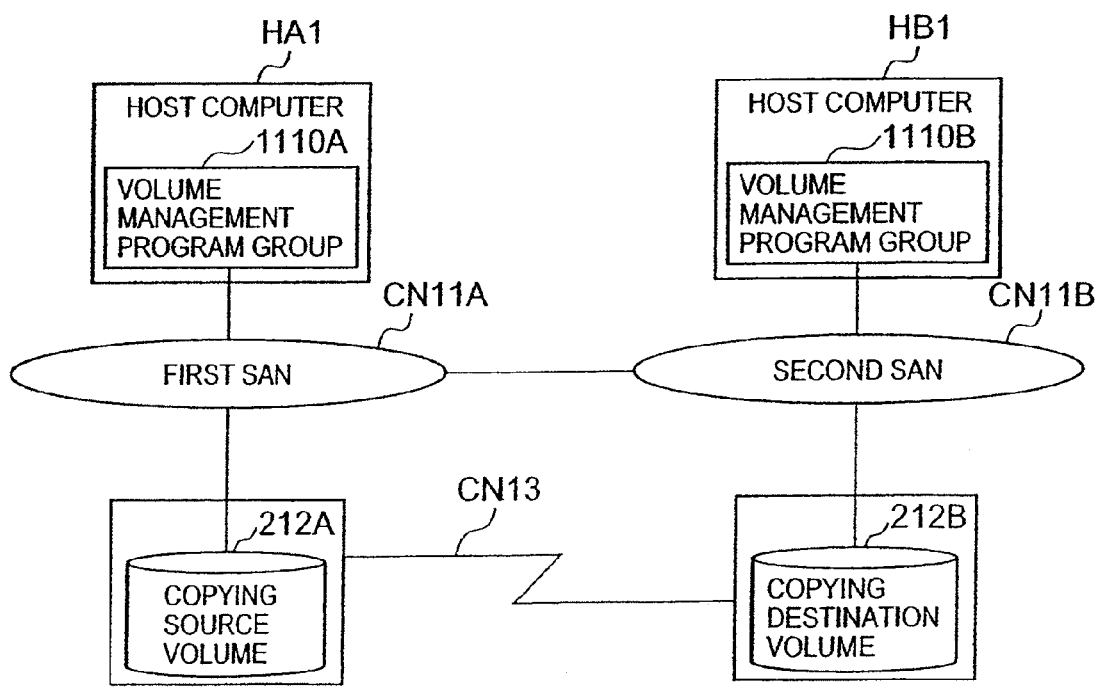
FIG. 21B shows one modification of the second example.

For example, as is shown in FIG. 21B, volume management program groups 1110A and 1110B can also be built into both host computers HA1 and HB1 that are respectively connected to separate communications networks CN11A and CN11B. Since both of the volume management program groups 1110A and 1110B can perform the processing described in the embodiment or first example, the usability of the storage system is improved.

Figure 22A:
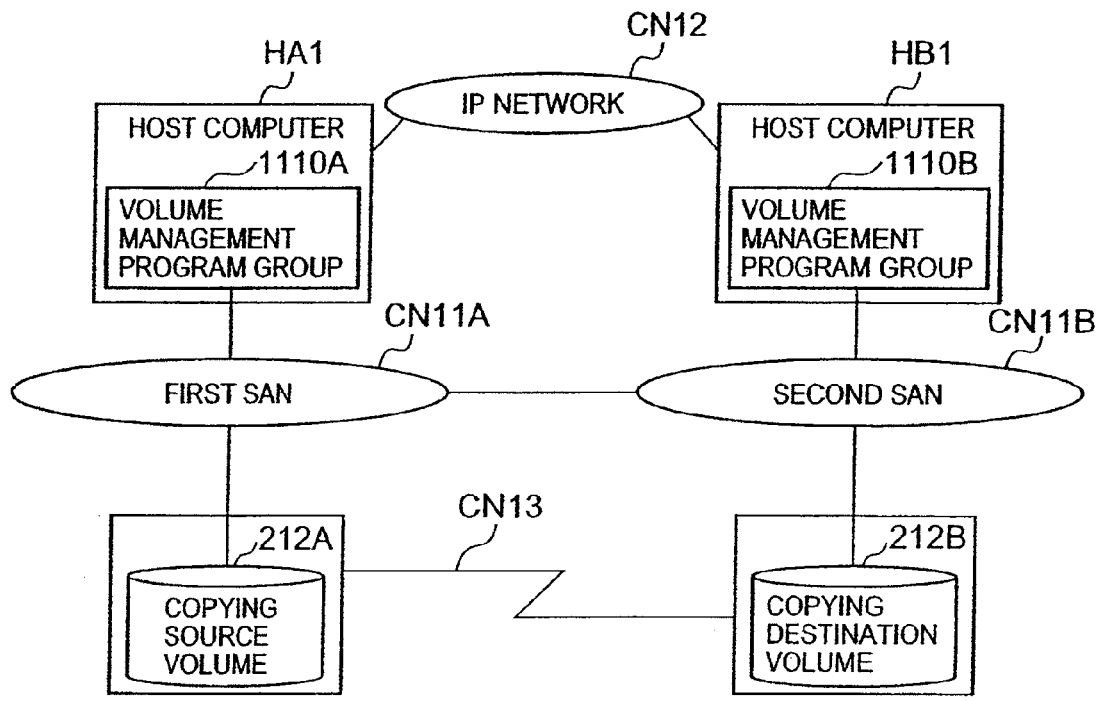
FIG. 22A shows another modification of the second example.

Furthermore, for example, as is shown in FIG. 22A, the host computers HA1 and HB1 in the storage system shown in FIG. 21B may also be connected via a communications network (e.g., a network according to the IP protocol) CN12 that connects the hosts to each other. In this case, for example, when the host computer HA1 cannot access a certain volume forming the volume pair, the host computer HA1 can transmit a notification of this to a separate host computer HB1, and the host computer HB1 can alter the "utilizable" flag of the volume that cannot be accessed (i.e., the "utilizable" flag in the pair managing table T2) to "not utilizable". As a result, the usability of the storage system can be improved.

Figure 22B:
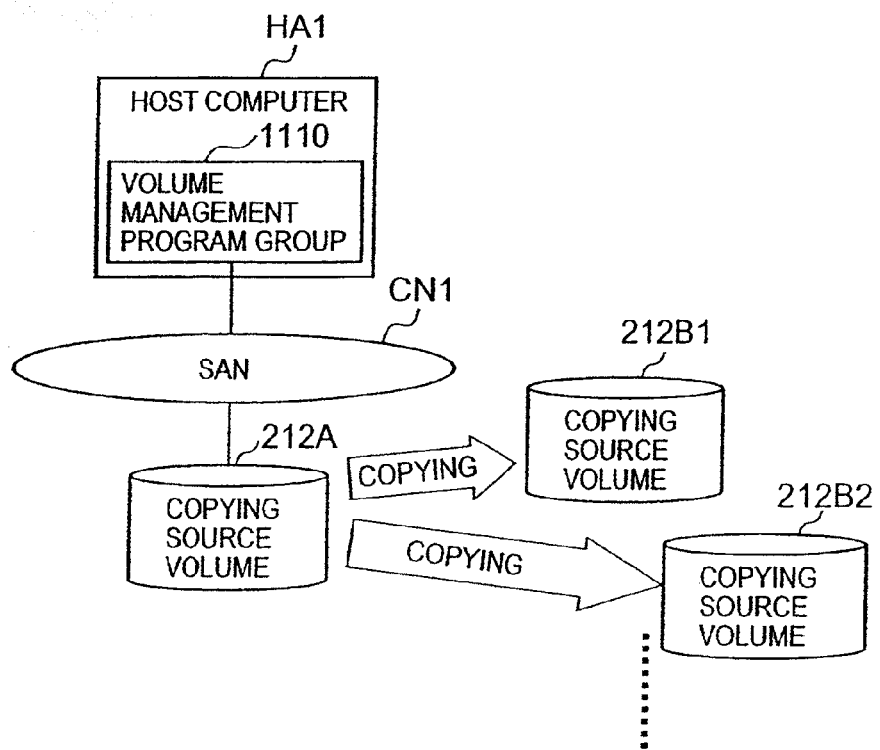
FIG. 22B shows still another modification of the second example.

Furthermore, for example, as is shown in FIG. 22B, a plurality of copying destination volumes 212B may exist for the copying source volume 212A. In this case, for example, volume information, pair states and "utilizable" flags for a plurality of volumes can be registered for each volume pair in the in the pair managing table T2. Furthermore, in this case, for example, the control module 3400 may perform a control action so that the pair states of the two or more volumes that form volume pairs are not simultaneously placed in a copying source state in the respective volume pairs.

Example 3

In a third example of an embodiment of the present invention, the processing that is performed by the volume management program groups 1110 can be controlled via the GUI (graphical user interface) that is provided by the volume management AP 4000 in the embodiment and first and second examples.

Figure 23:
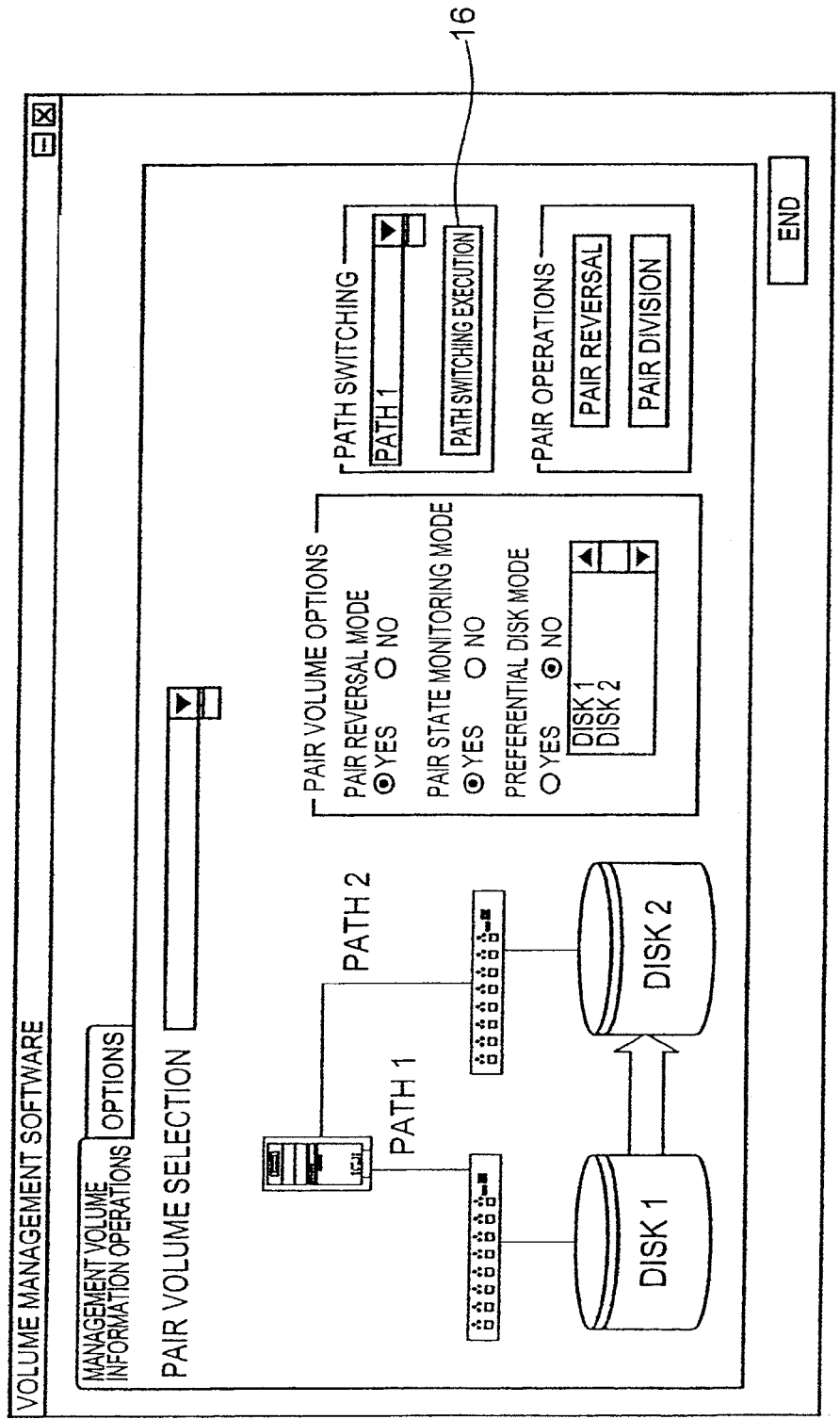
FIG. 23 shows an example of the construction of the first GUI screen that is provided by the volume management AP 4000 in a third example.

In cases where the volume management AP 4000 is started and a specified operation is performed by the user, the first GUI screen that is shown for example in FIG. 23 is displayed on the display screen 370. In cases where some type of information is input on this GUI screen, the volume management AP 4000 notifies the managing module 3400 of the content of the input information. The managing module 3400 sets the input information in a specified memory region (e.g., the memory 320), and performs control on the basis of this set information.

For example, in a case where the managing module 3400 receives notification that the "pair reversal mode" has been selected on the first GUI screen from the volume management AP 400, an indication of this may be set in a specified memory region. The managing module 3400 may then perform this pair reversal mode when the managing module 3400 detects the fact that an indication that the pair reversal mode has been selected has been set in a specified memory region. In concrete terms, for example, the managing module 3400 may judge whether or not a pair reversal operation is possible prior to the processing of S88 in FIG. 18, and may perform this operation only in cases where affirmative judgement results are obtained. In this regard, for example, there environments in which a pair reversal operation cannot be automatically performed by the operation of the storage system (e.g., when other host computers are operated using the same volume); accordingly, such performance of pair reversal after first judging whether or not a pair reversal operation is possible is useful. Furthermore, for example, information indicating whether or not a pair reversal operation has been selected may also be recorded in the pair managing table T2 for each volume pair.

Furthermore, for example, in cases where the managing module 3400 receives notification of the fact that the "pair state monitoring mode" has been selected on the first GUI screen from the volume management AP 400, the managing module 3400 may set an indication of this in a specified memory region. Subsequently, in cases where the managing module 3400 detects the fact that an indication that the pair state monitoring mode has been selected has been set in the specified memory region, the managing module 3400 may perform the pair state monitoring mode. In concrete terms, for example, the managing module 3400 may issue I/O requests to the volumes corresponding to the respective lower disk managing filter drivers 3300, either periodically or non-periodically, and may judge whether the paths between the respective drivers 3300 and the respective volumes are normal or abnormal by referring to the contents of the return values. As a result, the early detection of path trouble and path failover prior to actual processing are possible. Furthermore, for example, information indicating whether or not the pair state monitoring mode has been selected can be recorded in the pair managing table T2 for each volume pair.

Furthermore, for example, in cases where the managing module 3400 receives notification that the "preferential disk mode" has been selected on the first GUI screen from the volume management AP 400, the managing module 3400 may set an indication of this in a specified memory region. Subsequently, when the managing module 3400 detects that an indication that the preferential disk mode has been selected has been set in this specified memory region, the managing module 3400 may perform this preferential disk mode. In concrete terms, for example, in the processing flow described with reference to FIG. 15, the managing module 3400 may detect the volume that has been selected as the preferential disk, and may preferentially set the name of the lower disk managing filter driver 3300 that corresponds to this volume in the I/O issuing lower driver data. The communications paths from the host computer to the volumes that orthogonal mark the copying pair seldom have the same conditions, and there is a possibility that preferences will be attached. Accordingly, such a preferential disk mode is useful. Furthermore, for example, information indicating whether or not the preferential disk mode has been selected can be recorded for each volume pair in the pair managing table T2. Moreover, information indicating which volumes have been selected as preferential disks can be recorded or each volume pair in the table T2.

Furthermore, for example, in cases where the managing module 3400 receives notification from the volume management AP 400 that "bus switching execution" has been selected on the first GUI screen (e.g., that the button 16 has been pressed), processing that is used to switch the volume that is recognized by the second AP 3500 to another volume that forms a pair with the first volume may be performed. For example, with respect to a certain volume pair in the pair managing table T2, all of the information that is recorded in the first volume information group column and all of the information that is recorded in the second volume information group column may be switched by the managing module 3400. Then, the managing module 3400 may reset the two program stacks respectively corresponding to the two volumes that form the certain volume pair (i.e., may delete the constructed sub-computer programs), and may successively start new sub-computer programs. The switching of the volume that is recognized by the second AP 3500 may be accomplished by performing such processing.

Furthermore, for example, in cases where the managing module 3400 receives notification from the volume management AP 400 that "bus switching execution" has been selected on the first GUI screen (e.g., that the button 16 has been pressed), the managing module 3400 may perform processing that is used to switch the volume that is recognized by the second AP 3500 to another volume that forms a pair with said first volume.

Figure 24:
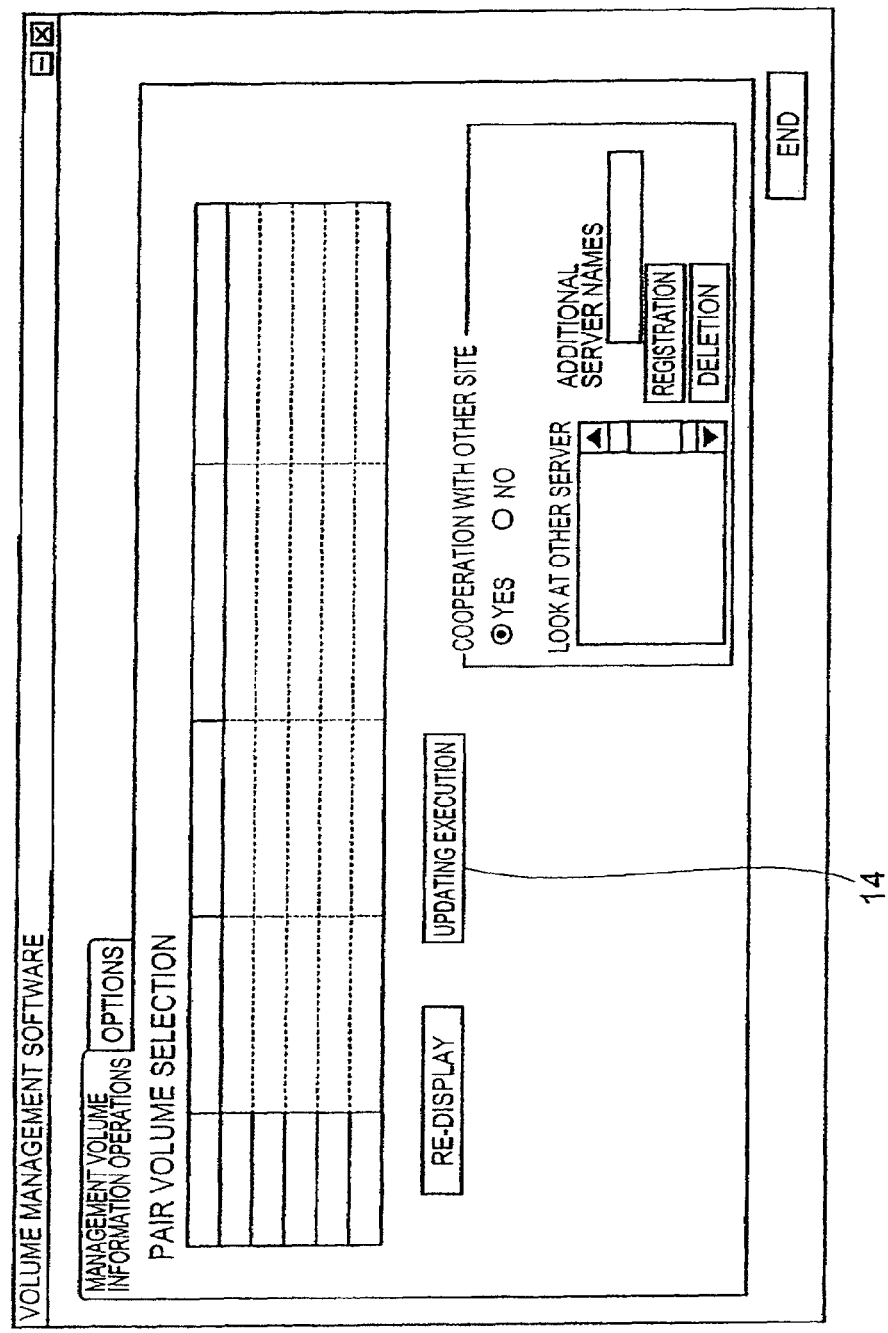
FIG. 24 shows an example of the construction of the second GUI screen that is provided by the volume management AP 4000 in this third example.

Furthermore, for example, in cases where a separate operation is performed by the user, the volume management AP 4000 may display the second GUI screen shown in FIG. 24 on the display screen 370. In this case, for example, in cases where the managing module 3400 receives notification from the volume management AP 400 that "execute updating" has been selected on the second GUI screen (e.g., that the button 14 has been pressed), the managing module 3400 may reset the program stacks for volumes that meet specified conditions. Here, the term "specified conditions" may refer to the setting of various conditions such as volumes designated by the user, volumes in which the access frequency is lower than a specified value, and the like.

A preferred embodiment and several examples of the present invention were described above. However, these are merely examples used to illustrate the present invention; the scope of the present invention is not limited to the above embodiment and examples alone. The present invention can be worked in various other configurations.

What is claimed is:

1. A computer configured to be coupled to a storage system comprising:
   a memory storing pair management information which indicates a copy pair including a first volume and a second volume in the storage system; and
   a processor configured to send a copy command to copy between the first volume and the second volume,
   wherein the memory stores a first driver which relates to the first volume and a second driver which relates to the second volume, the first driver set as an I/O issuing driver and the second driver set as a driver which communicates with an application,
   wherein when the second driver receives an I/O request, the second driver sends the I/O request to the first driver, and the first driver issues the I/O request to the first volume, and
   wherein when the first driver receives a response to the I/O request, the first driver sends the response to the second driver, and the second driver sends the response to the application.

2. A computer according to claim 1, wherein the memory further stores I/O issuing driver information which indicates the first driver being set as an I/O issuing driver, wherein the second driver receives the I/O request, the second driver sends the I/O request to the first driver using the I/O issuing driver information.

3. A computer according to claim 1, wherein the memory further stores I/O issuing driver information which indicates the first driver is set as the I/O issuing driver, wherein the first driver receives the I/O request from the second driver, the first driver issues the I/O request to the first volume using the I/O issuing driver information.

4. A computer according to claim 1, wherein the first volume is a source volume in the copy pair and the second volume is a target volume in the copy pair.

5. A computer according to claim 1, wherein setting of the I/O issuing driver is changed from the first driver to the second driver, wherein when the first driver receives the I/O request, the first driver sends the I/O request to the second driver, and the second driver issues the I/O request to the first volume.

6. A computer according to claim 1, wherein the memory further stores communication driver information which indicates the second driver as a driver which communicates with the application, wherein when the first driver receives the response to the I/O request, the first driver sends the response to the second driver using the communication driver information.

7. A computer according to claim 1, wherein the memory further stores communication driver information which indicates the second driver is set as a driver which communicates with the application, wherein when the second driver receives the response from the first driver, the second driver sends the response to the application using the communication driver information.

8. A computer system comprising:
   a storage system which includes a plurality of disks which forms a first volume and a second volume; and
   a host computer including a memory storing an application and pair management information which indicates a copy pair including the first volume and the second volume, and a processor sending a copy command to the storage system to copy between the first volume and the second volume,
   wherein the memory stores a first driver which relates to the first volume and a second driver which relates to the second volume, the first driver set as I/O issuing driver and the second driver set as a driver which communicates with the application,
   wherein when the second driver receives an I/O request from the application, the second driver sends the I/O request to the first driver, and the first driver issues the I/O request to the first volume in the storage system, and
   wherein when the first driver receives a response to the I/O request, the first driver sends the response to the second driver, and the second driver sends the response to the application.

* * * * *